United States Patent
Kimura

(10) Patent No.: US 9,439,157 B2
(45) Date of Patent: Sep. 6, 2016

(54) RADIO BASE STATION AND METHOD FOR CONTROLLING TRANSMISSION POWER IN RADIO BASE STATION

(71) Applicant: FUJITSU LIMITED, Kawasaki-shi, Kanagawa (JP)

(72) Inventor: Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/572,986

(22) Filed: Dec. 17, 2014

(65) Prior Publication Data

US 2015/0201386 A1   Jul. 16, 2015

(30) Foreign Application Priority Data

Jan. 16, 2014  (JP) .................................. 2014-005904

(51) Int. Cl.
*H04W 52/14* (2009.01)
*H04W 52/24* (2009.01)
*H04W 52/28* (2009.01)
*H04W 52/34* (2009.01)

(52) U.S. Cl.
CPC ......... *H04W 52/245* (2013.01); *H04W 52/143* (2013.01); *H04W 52/281* (2013.01); *H04W 52/346* (2013.01)

(58) Field of Classification Search
CPC .......................... H04W 52/143; H04W 52/245
USPC .......... 455/522, 69, 452.2, 452.1, 67.11, 509
See application file for complete search history.

(56) References Cited

U.S. PATENT DOCUMENTS

| | | | | |
|---|---|---|---|---|
| 2004/0127258 A1* | 7/2004 | Taketsugu | ............. | H04W 88/12 455/560 |
| 2011/0194527 A1 | 8/2011 | Lin et al. | | |
| 2011/0217974 A1* | 9/2011 | Naka | ...................... | H04B 1/707 455/423 |
| 2012/0320854 A1* | 12/2012 | Sumasu | ............... | H04J 11/0056 370/329 |
| 2012/0329400 A1* | 12/2012 | Seo | ........................ | H04J 11/005 455/63.1 |
| 2015/0124720 A1* | 5/2015 | Morimoto | ............. | H04W 48/12 370/329 |

FOREIGN PATENT DOCUMENTS

| | | |
|---|---|---|
| JP | 2012-129646 | 7/2012 |
| JP | 2013-042339 | 2/2013 |
| JP | 2013-520088 | 5/2013 |
| JP | 2013-521740 | 6/2013 |
| WO | 2011/093093 | 8/2011 |

* cited by examiner

*Primary Examiner* — John J Lee
(74) *Attorney, Agent, or Firm* — Fujitsu Patent Center

(57) ABSTRACT

A radio base station measures a reception power of a downlink radio signal transmitted for a first radio area and controls a transmission power of a downlink radio signal to be transmitted for a second radio area according to the measured reception power.

12 Claims, 23 Drawing Sheets

RADIO BASE STATION AND METHOD FOR CONTROLLING TRANSMISSION POWER IN RADIO BASE STATION

CROSS-REFERENCE TO RELATED APPLICATION

This application is based upon and claims the benefit of priority of the prior Japanese Patent application No. 2014-005904, filed on Jan. 16, 2014, the entire contents of which are incorporated herein by reference.

FIELD

The present invention relates to a radio base station and a method for controlling a transmission power in the radio base station.

BACKGROUND

A radio communication system including a radio base station and a radio terminal has been known. For example, a radio communication system, which is disclosed in patent documents (JP 2012-129646 A, WO 2011/093093 A1, JP 2013/521740 T, JP 2013/520088 T, and JP 2013-42339 A), includes a macro base station and a micro base station, a radio area of which is narrower than that of the macro base station. The micro base station is arranged within the radio area provided by the macro base station. Since, in the radio communication system, some radio terminals, among a plurality of radio terminals located within the radio area provided by the macro base station, are accommodated by the micro base station, a communication load can be dispersed.

Furthermore, in the radio communication system disclosed in the patent documents, the macro base station sets transmission powers of a plurality of different radio resources to be different from each other. Also, in the radio communication system disclosed in the patent documents, the macro base station punctures (or mutes) a specific resource element among the radio resources.

Also, in the radio communication system disclosed in the patent documents, the radio base station applies power boosting to a specific reference signal. The power boosting is to increase a transmission power of a resource element assigned to a reference signal by borrowing a power of a resource element different from the resource element assigned to the reference signal.

SUMMARY

According to an aspect, a radio base station measures a reception power of a downlink radio signal transmitted for a first radio area. The radio base station controls a transmission power of a downlink radio signal to be transmitted for a second radio area according to the measured reception power.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
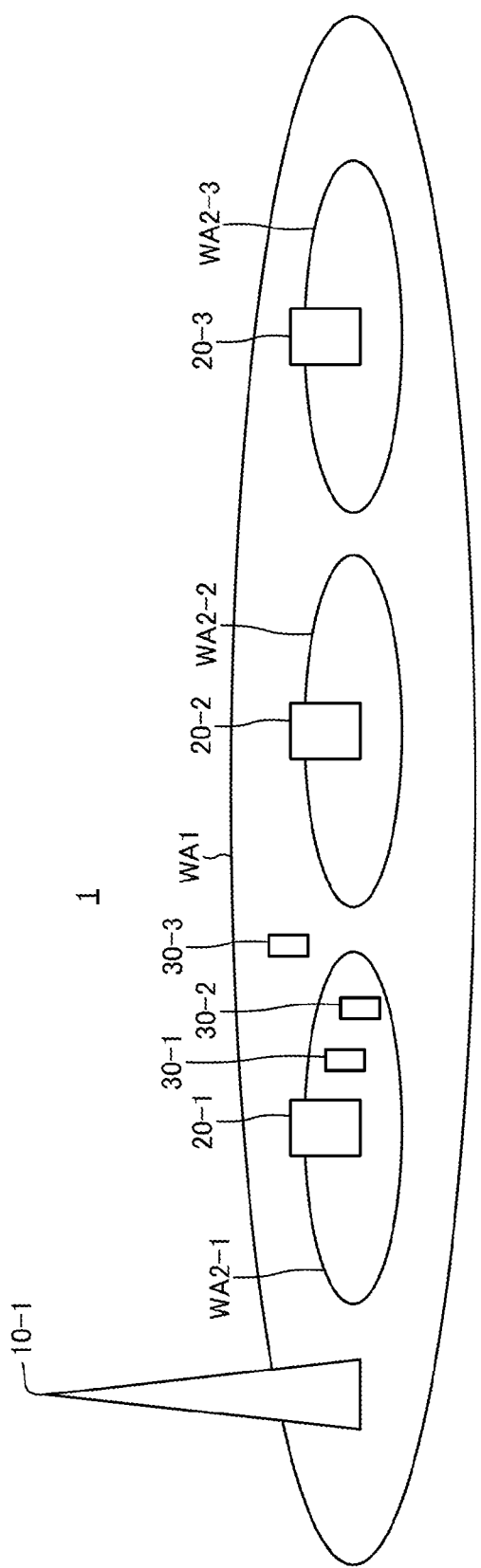
FIG. 1 is a block diagram illustrating a configuration example of a radio communication system according to a first embodiment.

A radio communication system may determine a radio area accommodating a radio terminal, based on a reception power of a downlink radio signal, which is transmitted for the radio area, at the radio terminal. For example, it is assumed that a first base station forming a first radio area is arranged near a second radio base station forming a second radio area in the first radio area. In this case, a reception power of a downlink radio signal transmitted for the first radio area may be higher than a reception power of a downlink radio signal transmitted for the second radio area, at a radio terminal located in the second radio area. In this case, the radio terminal is not accommodated in the second radio area. Therefore, it is apprehended that a communication load is not dispersed when the reception power of the downlink radio signal transmitted for the first radio area is higher than the reception power of the downlink radio signal transmitted for the second radio area.

Embodiments of the present disclosure will be described below with reference to the drawings. The embodiments as described below are only exemplary. Therefore, it is not excluded to apply various modifications and technologies which are not illustrated below to the embodiments. In the drawings used in the following embodiments, parts assigned with the same reference numerals refer to the same or similar parts unless modifications or changes are explicitly specified.

<First Embodiment>

(Overview)

A radio communication system according to a first embodiment includes a radio terminal and a radio base station forming a radio area for communication with the radio terminal by using a radio resource.

The radio base station measures a reception power of a downlink radio signal transmitted for a first radio area. The radio base station controls a transmission power of a downlink radio signal to be transmitted for a second radio area according to the measured reception power.

Therefore, the radio base station can increase a power to be distributed to a radio resource to be assigned to a certain signal in the second radio area, as the reception power of the first radio area increases. Therefore, the reception power of the signal, which is included in the downlink radio signal transmitted for the second radio area, at the radio terminal can be higher than the reception power of the downlink radio signal, which is transmitted for the first radio area, at the radio terminal. Thus, it is possible to increase the number of radio terminals to be accommodated in the second radio area. As a result, a communication load can be dispersed.

A radio communication system according to a first embodiment will be described below in detail.

(Configuration)

As illustrated in FIG. 1, the radio communication system 1 according to the first embodiment includes L macro base stations 10-1, . . . , 10-L, M micro base stations 20-1, . . . , 20-M, and N radio terminals 30-1, . . . , 30-N. The L, M, and N represent an integer of 1 or more, respectively. FIG. 1 illustrates an example in which the L is 1, the M is 3, and the N is 3.

Hereinafter, a macro base station 10-i is also referred to as a macro base station 10 if discrimination is not required. In this case, i represents an integer of 1 to L. Similarly, a micro base station 20-j is also referred to as a micro base station 20 if discrimination is not required. In this case, j represents an integer of 1 to M. Similarly, a radio terminal 30-k is also referred to as a radio terminal 30 if discrimination is not required. Herein, k represents an integer of 1 to N. Also, the macro base station 10 and the micro base station 20 are also referred to as a base station 10 or 20 if discrimination is not required. The base station 20 is an example of a radio base station.

The radio communication system 1 performs radio communication between the base station 10 or 20 and the radio terminal 30 according to a certain radio communication scheme. For example, the radio communication scheme is an LTE scheme. The LTE is an abbreviation for Long Term Evolution. The radio communication scheme may be a scheme different from the LTE scheme (for example, LTE-Advanced scheme or WiMAX scheme). The WiMAX is an abbreviation for Worldwide Interoperability for Microwave Access.

In the present example, each of the base stations 10 and 20 forms one radio area. Each of the base stations 10 and 20 may form a plurality of radio areas. The radio area may be also referred to as a coverage area or a communication area. For example, the radio area is a cell, such as a macro cell, a micro cell, a nano cell, a pico cell, a femto cell, a home cell, or a sector cell. Each of the base stations 10 and 20 performs radio communication with the radio terminal 30 located in a radio area formed by the relevant base station 10 or 20.

For example, each of the base stations 10 and 20 provides a radio resource for the radio area formed by the relevant base station 10 or 20. In the present example, the radio resource is a radio signal element which is identified by a time and a frequency. Each of the base stations 10 and 20 performs communication with the radio terminal 30 located in the radio area formed by the relevant base station 10 or 20 by using the radio resource provided in the radio area. Each of the base stations 10 and 20 may be an access point, an Evolved Node B (eNB), a Node B (NB), a femto base station, a macro base station, or a home base station.

In the present example, a maximum value of a power which can be output as a transmission power of a radio signal at the macro base station 10, is higher than that at the micro base station 20. Therefore, the macro base station 10 forms a radio area which is broader than a radio area that is formed by the micro base station 20.

In the present example, the micro base stations 20-1 to 20-3 are arranged within a radio area WA1 formed by the macro base station 10-1. Furthermore, radio areas WA2-1 to WA2-3 respectively formed by the micro base stations 20-1 to 20-3 are located within the radio area WA1 formed by the macro base station 10-1. The radio area WA1 is an example of a first radio area. Each of the radio areas WA2-1 to WA2-3 is an example of a second radio area.

Also, in the present example, the respective base stations 10 and 20 are connected to a communication network (for example, core network) so as to perform wired communication through a communication line (not illustrated). The respective base stations 10 and 20 may be connected to the communication network so as to perform radio communication. An interface between the base station 10 or 20 and the communication network may be also referred to as an S1 interface. Also, an interface between the base station 10 and the base station 20 may be also referred to as an X2 interface.

Also, a part of the radio communication system 1 including devices closer to the communication network (in other words, the part having an upper level) than the base stations 10 and 20 is referred to as an EPC, which is an abbreviation for Evolved Packet Core. A part of the radio communication system 1 formed by the base stations 10 and 20 are referred to as an E-UTRAN, which is an abbreviation for Evolved Universal Terrestrial Radio Access Network.

Each radio terminal 30 performs radio communication with the base station 10 or 20, which forms a radio area, by using a radio resource provided for the relevant radio area in which the relevant radio terminal 30 is located. The radio terminal 30 may be also referred to as a mobile station, a terminal device, or a user equipment (UE).

When the radio terminal 30 is located in a plurality of radio areas, the radio communication system 1 determines a radio area accommodating the radio terminal 30 based on reception powers of downlink radio signals, which are transmitted for the respective radio areas, at the radio terminal 30. The radio communication system 1 may determine a radio area accommodating the radio terminal 30 based on communication qualities of the downlink radio signals instead of the reception powers of the downlink radio signals.

In the present example, when the radio terminal 30 is not accommodated in any radio area, the radio communication system 1 determines a radio area, at which the reception power is the maximum, as a radio area in which the radio terminal 30 is to be accommodated.

Also, it is assumed that the radio terminal 30 is accommodated in a radio area (also referred to as an "accommodation radio area"). In this case, it is assumed that a value obtained by subtracting a reception power of a downlink radio signal transmitted for the accommodation radio area from a reception power of a downlink radio signal transmitted for another radio area is equal to or greater than a certain reference value. In this case, the radio communication system 1 determines the other radio area as a radio area in which the radio terminal 30 is to be accommodated.

For example, the accommodation of the radio terminal 30 in the radio area means that the radio terminal 30 is connected to the base station 10 or 20 so as to transmit data to the base station 10 or 20, that forms the radio area, and receive data from the base station 10 or 20, by using a radio resource provided for the radio area.

(Configuration: Micro Base Station)

Figure 2:
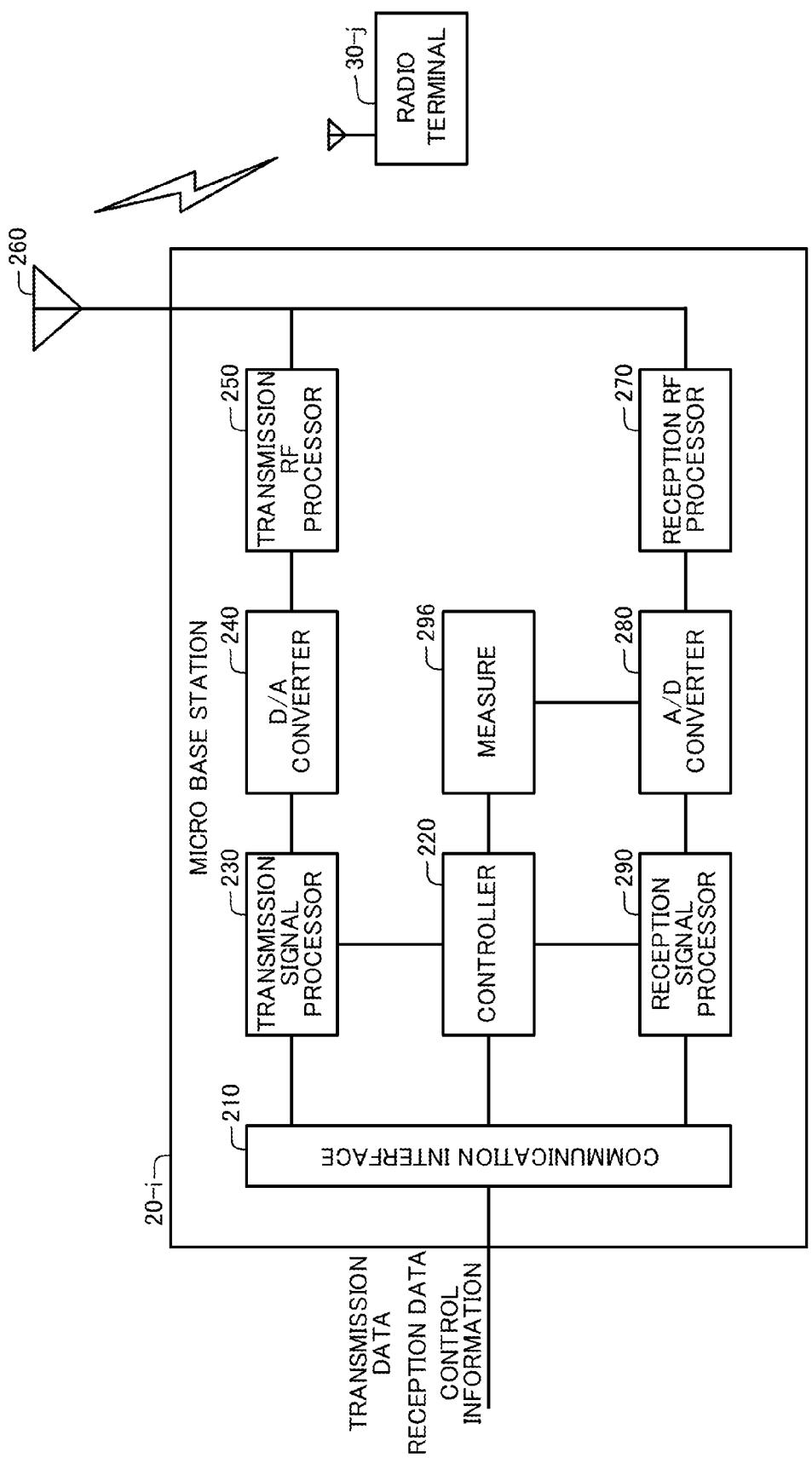
FIG. 2 is a block diagram illustrating a configuration example of a micro base station of FIG. 1.

As illustrated in FIG. 2, the micro base station 20-i illustratively includes a communication interface 210, a controller 220, a transmission signal processor 230, a digital to analog (D/A) converter 240, a transmission RF processor 250, and an antenna 260. The RF is an abbreviation for Radio Frequency. Also, the micro base station 20-i illustratively includes a reception RF processor 270, an analog to digital (A/D) converter 280, a reception signal processor 290, and a measure 296.

A function of the micro base station 20-i may be realized by using large scale integration (LSI). At least a portion of a function of the micro base station 20-i may be realized by using a programmable logic circuit device (for example, PLD or FPGA). The PLD is an abbreviation for Programmable Logic Device. The FPGA is an abbreviation for Field-Programmable Gate Array.

The communication interface 210 receives transmission data that is to be transmitted to the radio terminal 30 from the communication network. Furthermore, the communication interface 210 transmits reception data from the radio terminal 30 to the communication network. In addition, the communication interface 210 transmits control information to the communication network and receives control information from the communication network. In the present example, the control information includes type information for identifying a type of base station that forms a radio area different from the radio area formed by the micro base station 20-i. In the present example, the types of base station includes a macro base station and a micro base station.

The controller 220 controls distribution of a transmission power for a radio resource. The controller 220 outputs an instruction to the transmission signal processor 230 such that a radio signal is transmitted according to the controlled distribution. The control for the distribution of the transmission power will be described in detail below.

Furthermore, the controller 220 selects the radio terminal 30 that performs communication with the micro base station 20-i and assigns a radio resource to the communication with the selected radio terminal 30. The controller 220 determines a modulation scheme and a transmission rate for the selected radio terminal 30. For example, the modulation scheme and the transmission rate may be represented by a modulation and coding scheme (MCS) index.

The controller 220 outputs an instruction to the transmission signal processor 230 and the reception signal processor 290 such that the communication with the selected radio terminal 30 is performed by using the radio resource assigned to the communication.

The transmission signal processor 230 outputs a modulation signal by performing modulation processing on transmission data to be transmitted to the radio terminal 30 according to the instruction from the controller 220. In the present example, the modulation processing includes orthogonal frequency division multiplexing (OFDM).

The D/A converter 240 performs D/A conversion on the modulation signal output by the transmission signal processor 230. The transmission RF processor 250 performs frequency conversion (herein, up conversion) from a baseband to a radio frequency band on the signal after the D/A conversion. The antenna 260 transmits a radio signal after the frequency conversion by the transmission RF processor 250. The radio signal to be transmitted by the antenna 260 is also referred to as a downlink radio signal.

Figure 3:
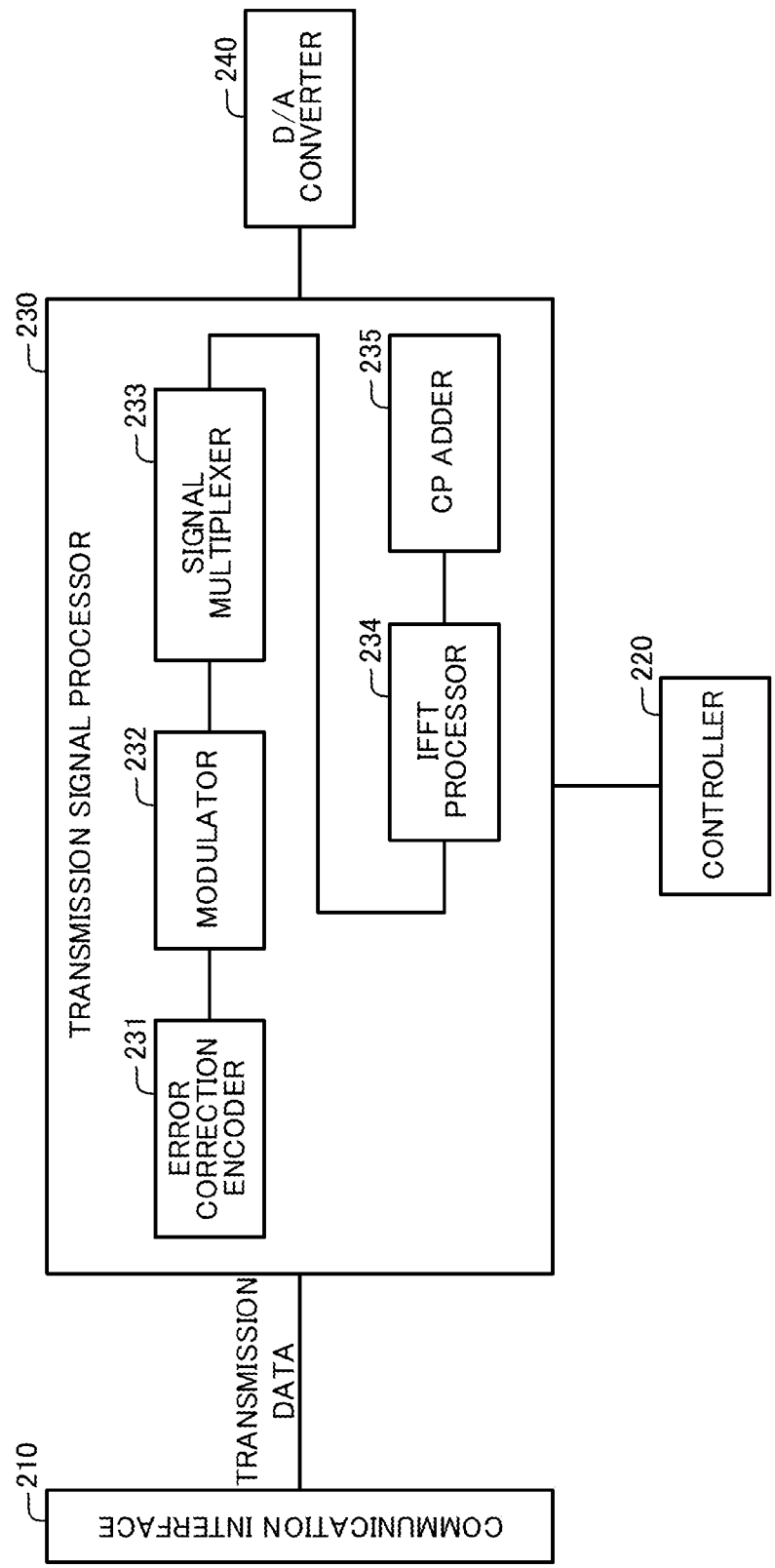
FIG. 3 is a block diagram illustrating a configuration example of a transmission signal processor of FIG. 2.

The transmission signal processor 230 will be described in detail. As illustrated in FIG. 3, the transmission signal processor 230 illustratively includes an error correction encoder 231, a modulator 232, a signal multiplexer 233, an IFFT processor 234, and a cyclic prefix (CP) adder 235.

The error correction encoder 231 adds an error correction code to transmission data. The modulator 232 performs channel encoding and data modulation on the transmission data to which the error correction code is added according to the modulation scheme and the transmission rate indicated by the controller 220. The modulator 232 outputs the transmission data after the channel encoding and the data modulation as a transmission data signal.

For example, the channel encoding can be performed by using Turbo encoding, Reed-Solomon encoding, or convolution encoding. The data modulation can be performed according to a modulation scheme including a multi-valued modulation scheme, for example, QPSK, 16QAM or 64QAM. The QPSK is an abbreviation for Quadrature Phase-Shift keying. The QAM is an abbreviation for Quadrature Amplitude Modulation.

The signal multiplexer 233 multiplexes the transmission data signal output by the modulator 232 and a control signal according to assignment of a radio resource by the controller 220. In the present example, the control signal includes a reference signal (RS), a synchronization signal (SS) and a broadcast signal.

The reference signal is an example of a signal known between the base station 10 or 20 and the radio terminal 30. The reference signal is used by the radio terminal 30 for measuring at least one of a reception power of a downlink radio signal and a communication quality of the downlink radio signal.

The synchronization signal includes an identifier that identifies a radio area. The synchronization signal is used by the radio terminal 30 for detecting the radio area.

The broadcast signal indicates information of which the base station 10 or 20 notify the radio terminal 30 that is located in a radio area formed by the relevant base station 10 or 20. The information is referred to as broadcast information. For example, the broadcast information includes a master information block (MIB). The MIB is information that is used by the radio terminal 30 for starting communication with the base station 10 or 20. For example, the MIB includes a system frame number (SFN) of a radio frame and a system bandwidth.

The IFFT processor 234 performs Inverse Fast Fourier Transform (IFFT) on a signal in which the transmission data signal and the control signal are multiplexed. The CP adder 235 adds a CP to the signal after the IFFT.

The transmission signal processor 230 outputs the signal after addition of the CP as the modulation signal.

Returning to FIG. 2, the antenna 260 receives an uplink radio signal transmitted by the radio terminal 30. Furthermore, the antenna 260 receives a downlink radio signal transmitted by the macro base station 10-1 for the radio area WA1 that is formed by the macro base station 10-1.

The reception RF processor 270 performs frequency conversion from a radio frequency band to a baseband (herein, down conversion) on the radio signal received by the antenna 260. The A/D converter 280 performs A/D conversion on the signal after the frequency conversion by the reception RF processor 270.

In the present example, the signal after the A/D conversion includes a first portion and a second portion. The first portion is a portion corresponding to, among the signal after the A/D conversion, an uplink radio signal transmitted by the radio terminal 30 for the radio area that is formed by the micro base station 20-i. The second portion is a portion corresponding to, among the signal after the A/D conversion, a downlink radio signal transmitted by the macro base station 10-1 for the radio area WA1 that is formed by the macro base station 10-1.

The reception signal processor 290 outputs reception data by performing demodulation processing on the first portion among the signal after the A/D conversion according to an instruction from the controller 220.

Figure 4:
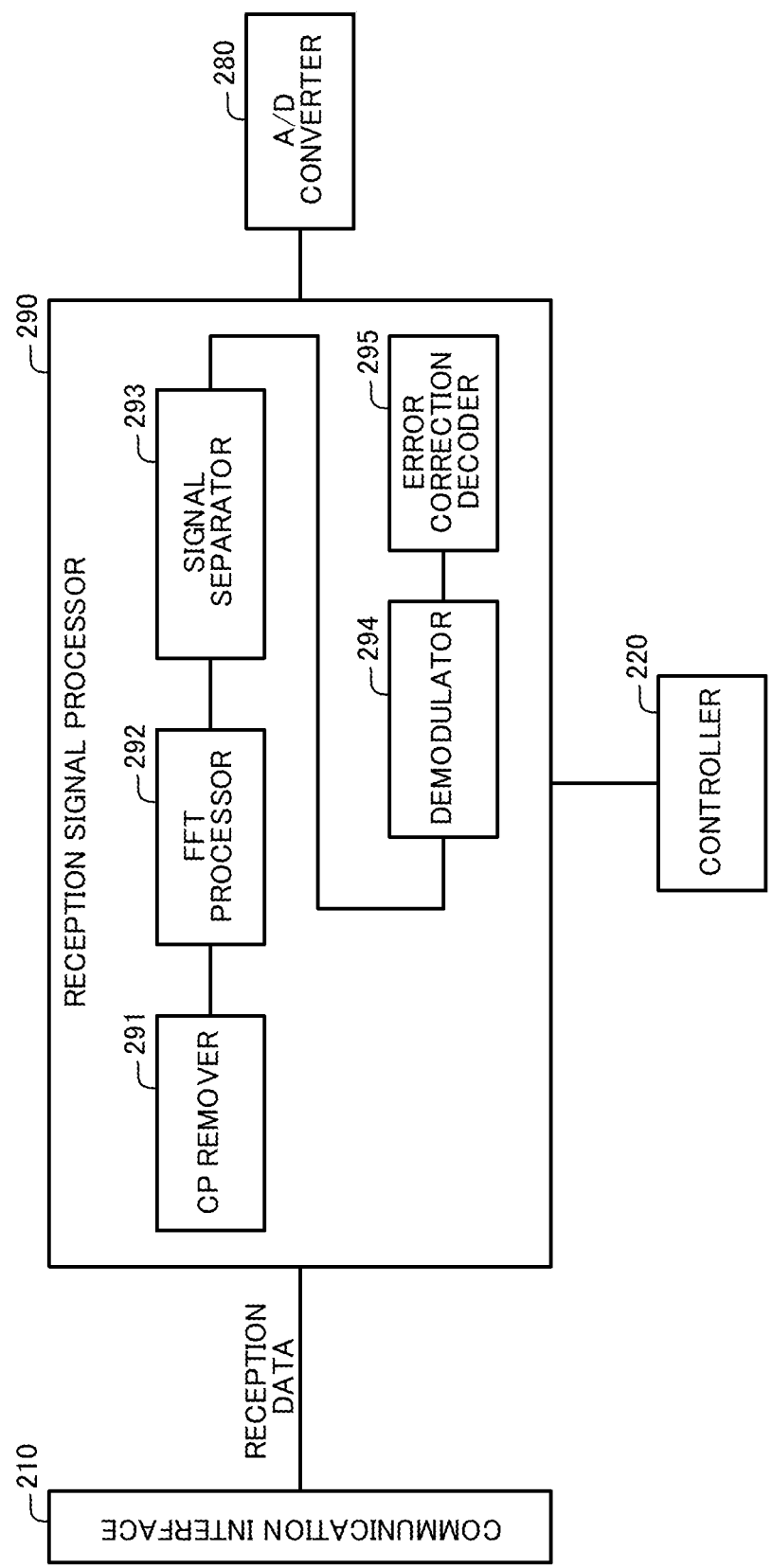
FIG. 4 is a block diagram illustrating a configuration example of a reception signal processor of FIG. 2.

The reception signal processor 290 will be described in detail. As illustrated in FIG. 4, the reception signal processor 290 illustratively includes a CP remover 291, a FFT processor 292, and a signal separator 293. Furthermore, the reception signal processor 290 illustratively includes a demodulator 294 and an error correction decoder 295.

The CP remover 291 removes the CP from the signal after the A/D conversion. The FFT processor 292 performs Fast Fourier Transform (FFT) on the signal after the removal of the CP.

The signal separator 293 separates a reception data signal and a control signal from the signal after the FFT according to assignment of a radio resource by the controller 220.

The demodulator 294 performs data demodulation and channel decoding on the reception data signal and the control signal from the signal separator 293 according to the modulation scheme and the transmission rate indicated by the controller 220. The demodulator 294 outputs the reception data signal and the control signal after the data demodulation and the channel decoding as reception data and control information, respectively.

The error correction decoder 295 performs error correction processing on the reception data and the control information output by the demodulator 294 based on the error correction code.

The measure 296 illustrated in FIG. 2 measures a reception power of a downlink radio signal transmitted for the radio area WA1 based on the second portion of the signal after the A/D conversion. In the present example, the measure 296 measures the reception power of the downlink radio signal based on the reference signal that is included in the downlink radio signal that is transmitted for the radio area WA1.

Herein, the control for distribution of the transmission power by the controller 220 will be described.

First, assignment of the radio resource to various signals that are included in the downlink radio signal will be described.

Figure 5:
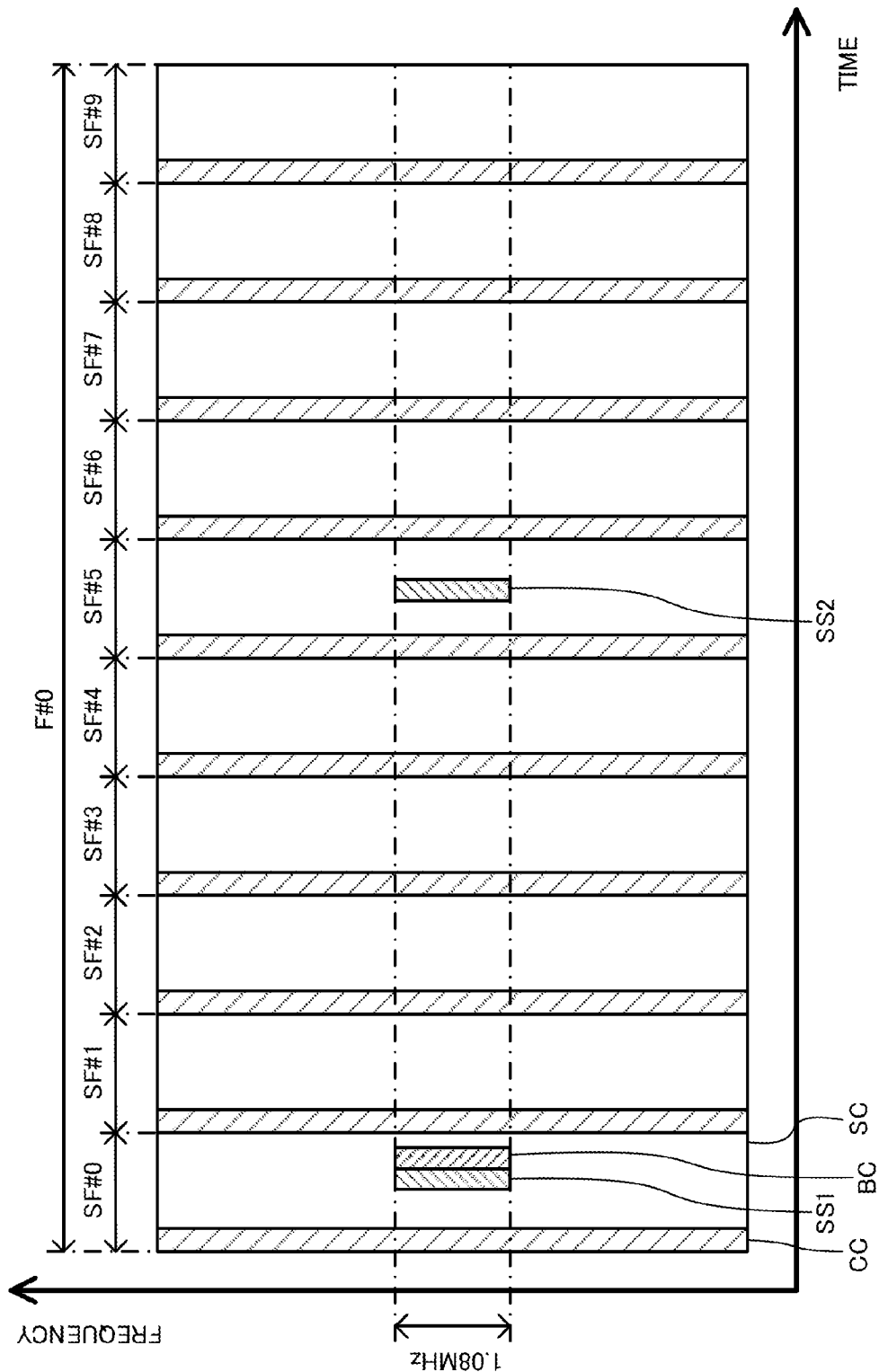
FIG. 5 is an explanatory diagram illustrating an example of a radio frame of a downlink radio signal.

Each of portions into which the downlink radio signal is divided by a first time length (in the present example, 10 ms) is referred to as a radio frame. As illustrated in FIG. 5, each of portions into which a radio frame F#0 of the downlink radio signal is divided by a second time length (in the present example, 1 ms) is referred to as a sub-frame.

Each of ten sub-frames SF#0 to SF#9 constituting the radio frame F#0 includes a control channel CC and a data channel SC. The control channel is, for example, a Physical Downlink Control Channel (PDCCH). The data channel is, for example, a Physical Downlink Shared Channel (PDSCH).

The control channel CC is used to transmit a control signal. The data channel SC is used to transmit a data signal. In the present example, the data signal is also referred to as a transmission data signal.

In the radio frame F#0, the first sub-frame SF#0 includes a synchronization signal SS1 and a broadcast channel BC. For example, the synchronization signal SS1 and the broadcast channel BC may be included in the sub-frame SF#0 at the central portion of a system band. For example, the broadcast channel is a Physical Broadcast Channel (PBCH). The broadcast channel BC is used to transmit a broadcast signal. In the present example, the central portion of the system band has a bandwidth of 1.08 MHz.

Also, the sixth sub-frame SF#5 of the radio frame F#0 includes a synchronization signal SS2. For example, the synchronization signal SS2 may be included in the sub-frame SF#5 at the central portion of the system band.

A time range of each of portions into which each sub-frame is divided by a third time length (in the present example, 0.5 ms) is referred to as a slot. For example, as illustrated in FIG. 6, the sub-frame SF#0 has two slots SL#0 and SL#1.

Also, a portion corresponding to a time length of one OFDM symbol of one sub-carrier in OFDM is referred to as a Resource Element (RE). In the present example, the time length of each of the slots SL#0 and SL#1 is a time length of seven OFDM symbols.

In each of the slots SL#0 and SL#1, a portion corresponding to 12 successive sub-carriers in OFDM is referred to as a resource block (RB). Therefore, in the present example, one RB is made up of 84 (=12×7) REs.

Figure 6:
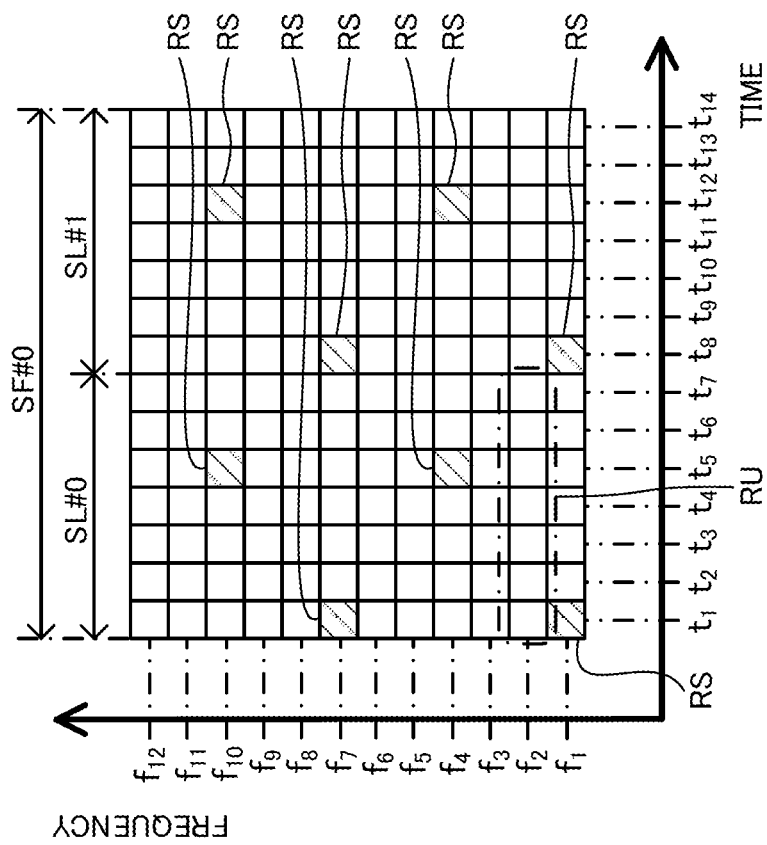
FIG. 6 is an explanatory diagram illustrating an example of a resource block included in the radio frame of FIG. 5.

In the present example, 12 sub-carrier frequencies $f_1$ to $f_{12}$ illustrated in FIG. 6 respectively correspond to the 12 successive sub-carriers in OFDM. In the present example, the RB has a frequency band corresponding to the 12 sub-carrier frequencies $f_1$ to $f_{12}$.

Also, 14 symbol times $t_1$ to $t_{14}$ illustrated in FIG. 6 respectively correspond to 14 successive symbols in OFDM.

In the present example, the RB has a time width corresponding to seven symbol times $t_1$ to $t_7$ or $t_8$ to $t_{14}$.

Although a format of two RBs is illustrated in FIG. 6, a format of the other RBs is also similar thereto.

The other sub-frames SF#1 to SF#9 also have a format identical to that of the sub-frame SF#0.

In the present example, for each RB, four REs corresponding to different sub-carriers are assigned to the reference signal RS as illustrated in FIG. 6. In the present example, for a plurality of RBs having a specific frequency band, a RE corresponding to a specific sub-carrier is assigned to the reference signal RS. In the example illustrated in FIG. 6, in both of the RB of the slot SL#0 and the RB of the slot SL#1, REs corresponding to sub-carrier frequencies $f_1$, $f_4$, $f_7$ and $f_{10}$ are assigned to the reference signals RS.

As illustrated in FIG. 6, in the RB of the slot SL#0, a RE corresponding to the symbol time $t_1$ and the sub-carrier frequency $f_1$ and a RE corresponding to the symbol time $t_1$ and the sub-carrier frequency $f_7$ are assigned to the reference signal RS. Furthermore, in the RB of the slot SL#0, a RE corresponding to the symbol time $t_5$ and the sub-carrier frequency $f_4$ and a RE corresponding to the symbol time $t_5$ and the sub-carrier frequency $f_{10}$ are assigned to the reference signal RS.

The controller 220 determines use resource units and a per-unit transmission power based on the reception power measured by the measure 296.

In the present example, the radio resource includes a plurality of resource units obtained by dividing the radio resource in a frequency domain. In the present example, the resource unit is a portion corresponding to one slot of one sub-carrier in OFDM. An example of the resource unit is made up of REs enclosed by a dashed dotted line RU in FIG. 6.

The per-unit transmission power is a transmission power per resource unit. The use resource unit is a resource unit that is used for signal transmission. In the present example, the use resource unit is a resource unit, the per-unit transmission power of which is set to a value greater than 0.

In the present example, the controller 220 previously stores information in which a reception power is associated with a use resource unit and a per-unit transmission power. For example, the controller 220 stores a first table as the information and determines use resource units and per-unit transmission powers based on the stored first table.

In the present example, the first table is set such that, as the reception power increases, the per-unit transmission power increases.

Figure 7:
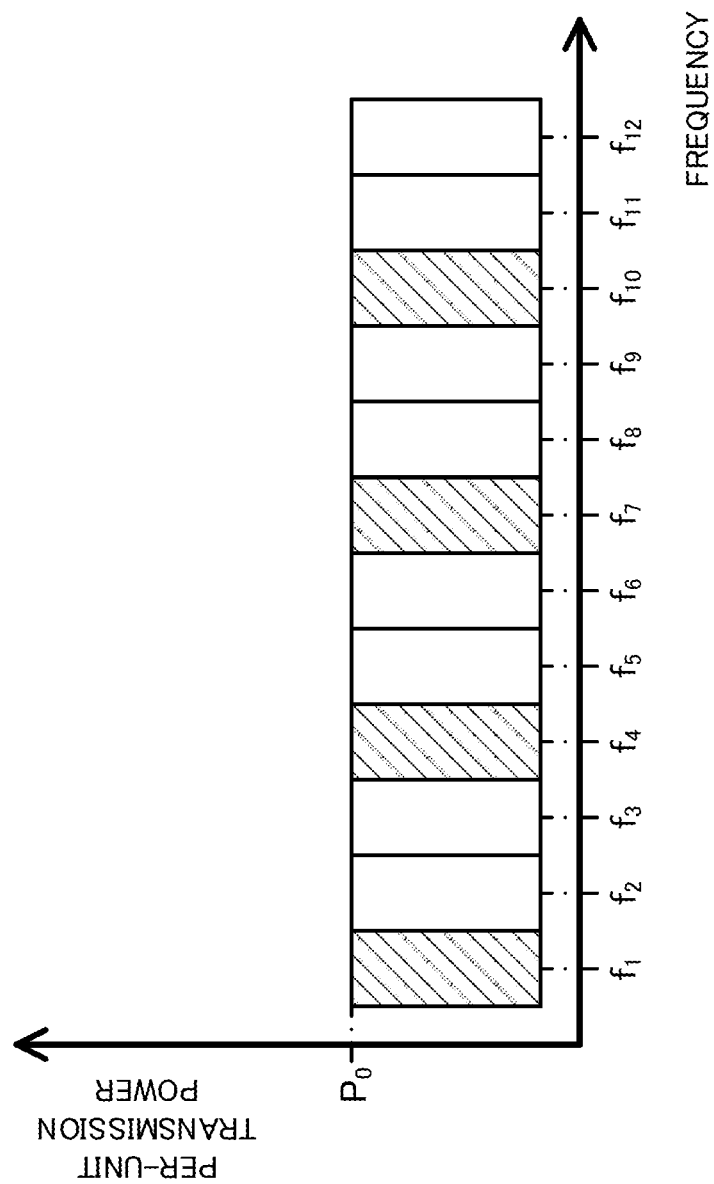
FIG. 7 is an explanatory diagram illustrating a setting example of use resource units and a per-unit transmission power of each use resource unit.

In the present example, the first table is set such that, when the reception power is lower than a first threshold power, a basic portion is determined as the use resource unit as illustrated in FIG. 7. In the present example, the basic portion is the whole of a system band. In this case, the first table is set such that a per-unit transmission power of each of the use resource units is determined to be a basic per-unit transmission power $P_0$.

Although a frequency band corresponding to one RB is illustrated in FIG. 7, the other RBs are also similar thereto. This is also applicable to FIGS. 8 and 9, which will be described below.

Figure 8:
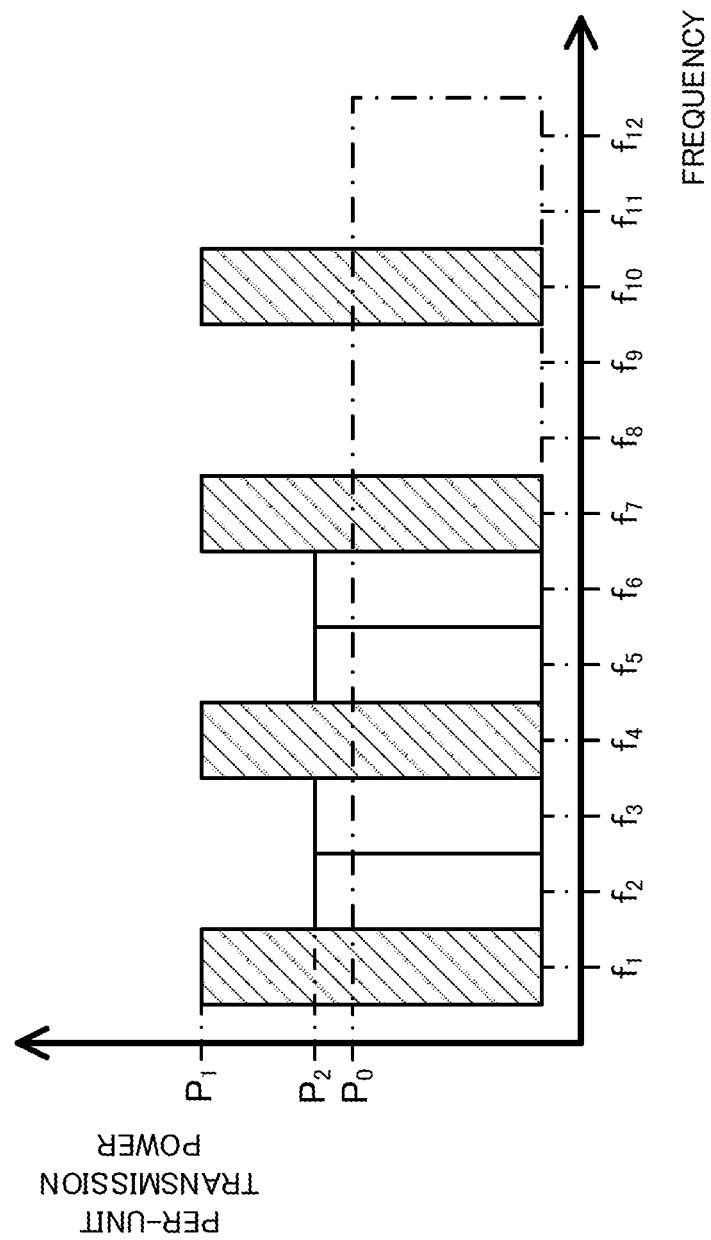
FIG. 8 is an explanatory diagram illustrating a setting example of use resource units and a per-unit transmission power of each use resource unit.

Also, in a case where the reception power is equal to or higher than the first threshold power and the reception power is lower than a second threshold power, the first table is set such that a first restrictive portion is determined as the use resource unit as illustrated in FIG. 8. In the present example, the first restrictive portion is a portion obtained by excluding, from the basic portion, four resource units of a high frequency side among resource units to which the reference signal RS is not assigned in each RB. In the present example, the first restrictive portion is a portion obtained by excluding, from the basic portion, resource units corresponding to sub-carrier frequencies $f_8$, $f_9$, $f_{11}$, and $f_{12}$.

In each RB, a resource unit to which the reference signal RS is not assigned is an example of a resource unit assignable to data. For example, the data is transmitted over a PDSCH. The PDSCH is an abbreviation for Physical Downlink Shared Channel. The data is an example of a first signal. The reference signal RS is an example of a second signal.

In the present example, a per-unit transmission power of a resource unit which is not determined as a use resource unit is set to 0. In order words, a resource unit, which is not determined as a use resource unit, is not used for transmission of a downlink radio signal. Not determining a resource unit as the use resource unit is an example of not assigning the resource unit to the downlink radio signal.

Furthermore, in this case, the first table is set such that a per-unit transmission power of a resource unit to which the reference signal RS is assigned is determined to be a first increased per-unit transmission power P. In the present example, the first increased per-unit transmission power $P_1$ is 1.8 times the basic per-unit transmission power $P_0$. In the present example, the resource unit to which the reference signal RS is assigned is made up of REs corresponding to sub-carrier frequencies $f_1$, $f_4$, $f_7$, and $f_{10}$.

Furthermore, in this case, the first table is set such that a per-unit transmission power of each of four resource units of a low frequency side, among the resource units to which the reference signal RS is not assigned, is determined to be a second increased per-unit transmission power $P_2$. In the present example, the second increased per-unit transmission power $P_2$ is 1.2 times the basic per-unit transmission power $P_0$. In the present example, the four resource units of the low frequency side among the resource units to which the reference signal RS is not assigned are made up of REs corresponding to sub-carrier frequencies $f_2$, $f_3$, $f_5$, and $f_6$.

Since the reference signal RS is used by the radio terminal 30 to start connection with the base station 10 or 20, the reference signal RS is a signal which can be received by the radio terminal 30 in priority to the data. Therefore, in the present example, the first table is set such that a per-unit transmission power of a resource unit to be assigned to the reference signal RS is higher than a per-unit transmission power of a resource unit to be assigned to the data.

Figure 9:
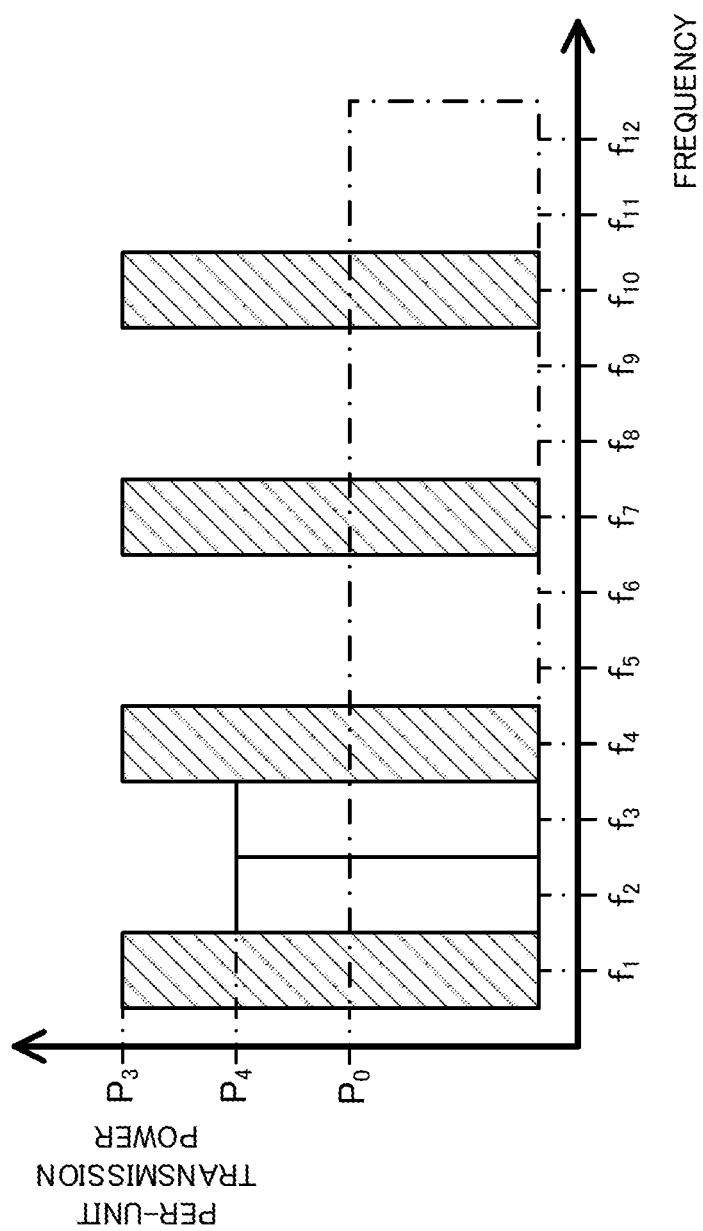
FIG. 9 is an explanatory diagram illustrating a setting example of use resource units and a per-unit transmission power of each use resource unit.

Also, the first table is set such that, when the reception power is equal to or higher than the second threshold power, a second restrictive portion is determined as a use resource unit as illustrated in FIG. 9. In the present example, the second restrictive portion is a portion obtained by excluding, from the basic portion, six resource units of a high frequency side among the resource units to which the reference signal RS is not assigned, in each RB. In the present example, the second restrictive portion is a portion obtained by excluding, from the basic portion, resource units corresponding to sub-carrier frequencies $f_5$, $f_6$, $f_8$, $f_9$, $f_{11}$ and $f_{12}$.

Furthermore, in this case, the first table is set such that a per-unit transmission power of a resource unit to which the reference signal RS is assigned is determined to be a third increased per-unit transmission power $P_3$. In the present example, the third increased per-unit transmission power $P_3$ is 2.2 times the basic per-unit transmission power $P_0$. In the present example, the resource unit to which the reference signal RS is assigned is made up of REs corresponding to sub-carrier frequencies $f_1$, $f_4$, $f_7$, and $f_{10}$.

Furthermore, in this case, the first table is set such that a per-unit transmission power of each of two resource units of a low frequency side among the resource units to which the reference signal RS is not assigned, is determined to be a fourth increased per-unit transmission power $P_4$. In the present example, the fourth increased per-unit transmission power $P_4$ is 1.6 times the basic per-unit transmission power $P_0$. In the present example, the two resource units of the low frequency side among the resource units to which the reference signal RS is not assigned are made up of REs corresponding to sub-carrier frequencies $f_2$ and $f_3$.

Therefore, in the present example, the first table is set such that, as the reception power increases, the per-unit transmission power increases and the number of resource units to be assigned to the downlink radio signal decreases. Thus, distribution of the transmission power to the radio resource to be assigned to the downlink radio signal is controlled.

Furthermore, in the present example, the first table is set such that a sum of transmission powers in respective RBs has a fixed value independently of reception power. The first table may be set such that the sum of transmission powers in respective RBs has a value varying depending on reception power.

(Operation)

Next, an operation of the radio communication system 1 will be described. Herein, among the operation of the radio communication system 1, a portion related with control for distribution of a transmission power to a radio resource will be described.

Although a description is given for an operation related to one radio area (also referred to as an assignment target radio area) among radio areas provided by the micro base station 20 in the present example, an operation related to the other radio areas will also be similarly described. Also, although a description is given with regard to a case where a plurality of radio areas WA1 and WA2-1 to WA2-3 are formed by different base stations in the present example, a case where a plurality of radio areas are formed by the same base station will be also similarly described.

Figure 10:
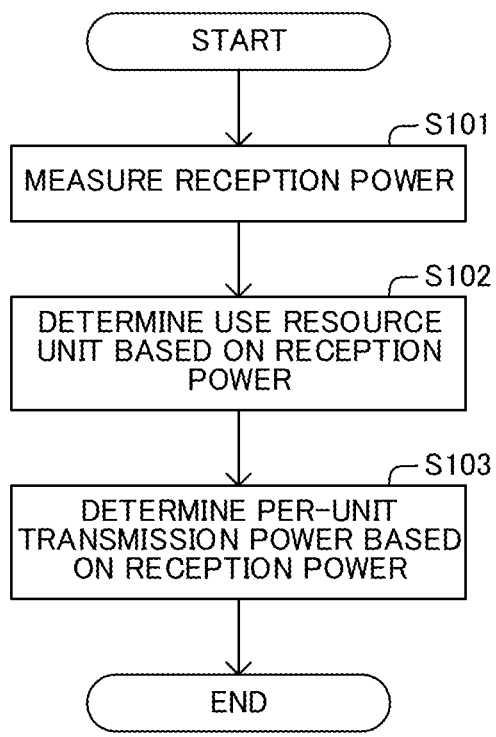
FIG. 10 is a flowchart illustrating an example of a process which the micro base station of FIG. 1 performs.

The micro base station 20-1 performs a process indicated by a flowchart of FIG. 10 when the micro base station 20-1 is activated. The micro base station 20-1 may perform the process of FIG. 10 each time when a certain period of time has elapsed, or according to a control signal received from the communication network through the communication interface 210.

In the present example, the micro base station 20-1 measures a reception power of a downlink radio signal transmitted for the radio area WA1 by the macro base station 10-1 (step S101 of FIG. 10). Subsequently, the micro base station 20-1 determines use resource units based on the measured reception power and a stored first table (step S102 of FIG. 10). Furthermore, the micro base station 20-1 determines a per-unit transmission power for each of the use resource units based on the measured reception power and the stored first table (step S103 of FIG. 10). In the process of FIG. 10, the processing of step S103 may be performed earlier than the processing of step S102.

In the present example, the micro base station 20-1 is arranged near the macro base station 10-1 as illustrated in FIG. 1. Therefore, the reception power of the downlink radio signal at the micro base station 20-1 which is transmitted for the radio area WA1 is higher than a reception power at the other micro base stations 20-2 and 20-3.

In the present example, it is assumed that the reception power of the downlink radio signal at the micro base station 20-1, which is transmitted for the radio area WA1 is equal to or higher than the second threshold power. Therefore, in this case, the micro base station 20-1 determines use resource units and per-unit transmission powers as illustrated in FIG. 9.

Thereafter, the micro base station 20-1 selects a radio terminal 30 that performs communication with the micro base station 20-1 and performs assignment of a radio resource by determining a radio resource to be used for the communication with the selected radio terminal 30 among the determined use resource units. The micro base station 20-1 transmits the respective use resource units of the downlink radio signal for the radio area WA2-1 at the per-unit transmission power determined for the respective use resource units.

Herein, it is assumed that the micro base station 20-1 uses the use resource units and the per-unit transmission powers which are illustrated in FIG. 7. In this case, an example of a region in which the radio terminal 30 is accommodatable in the radio area that is formed by the micro base station 20-1 is indicated by a dotted line CA21' of FIG. 11.

Figure 11:
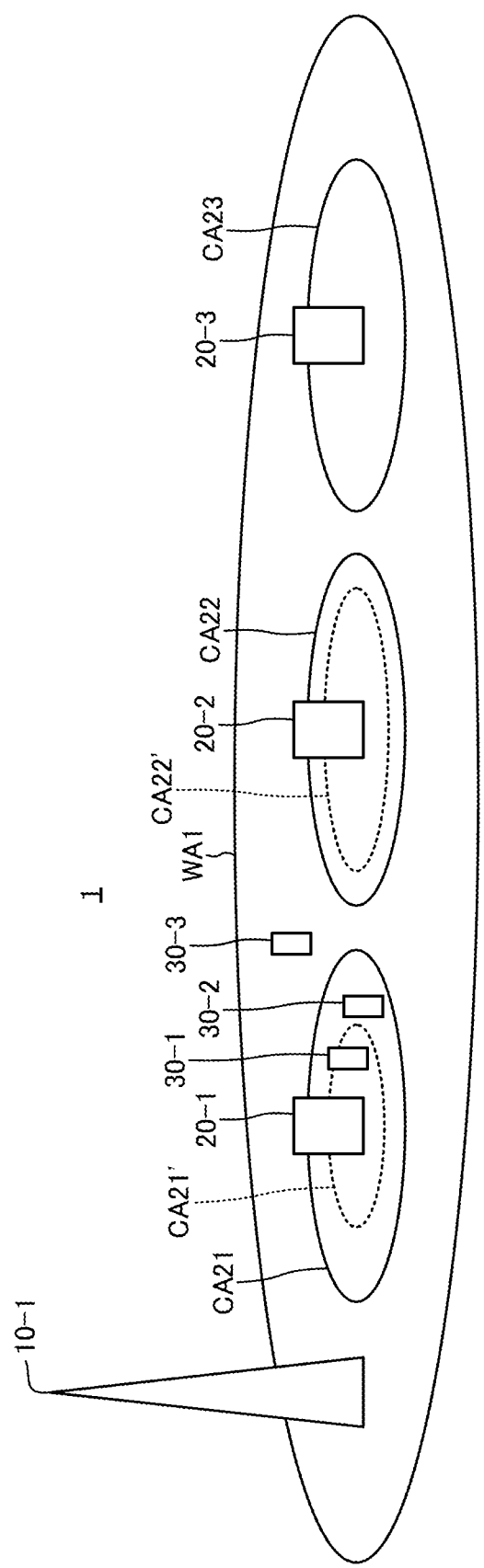
FIG. 11 is an explanatory diagram illustrating an example of a region in which radio terminals are accommodatable in a radio area formed by the micro base station of FIG. 1.
Figure 12:
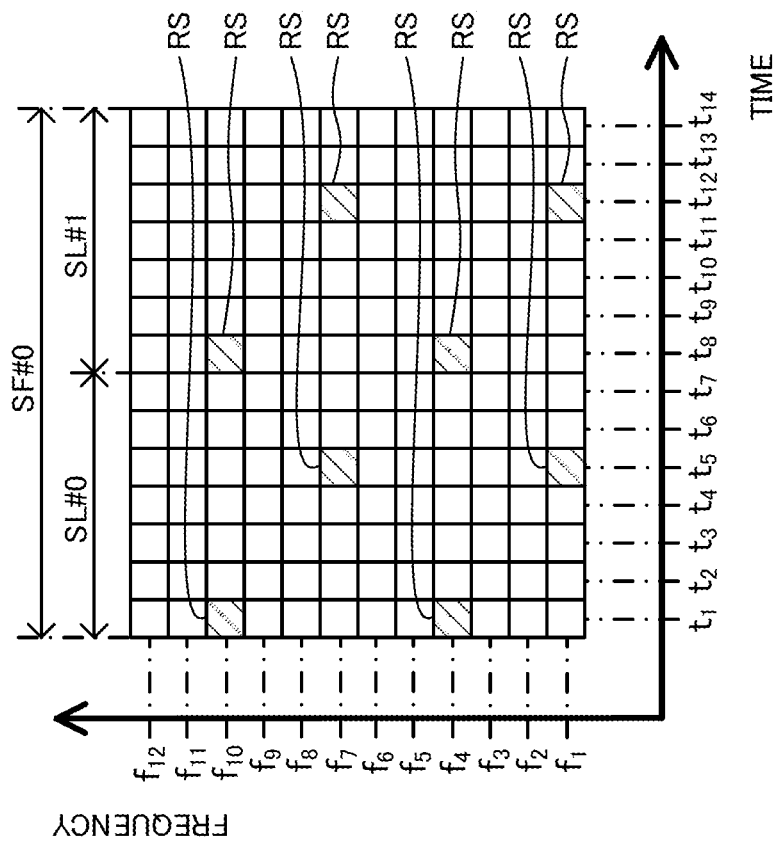
FIG. 12 is an explanatory diagram illustrating an example of a resource block in a case where a downlink radio signal is transmitted from a plurality of antennas.

On the other hand, an example of a region in which the radio terminal 30 is accommodatable in the radio area formed by the micro base station 20-1 according to the first embodiment is indicated by a dotted line CA21 of FIG. 11. Thus, according to the micro base station 20-1 according to the first embodiment, it is possible to extend the region in which the radio terminal 30 is accommodatable in the ratio area.

The micro base station 20-2 also performs the process of FIG. 10 as in the micro base station 20-1. In the present example, it is assumed that a reception power of a downlink radio signal at the micro base station 20-2, which is transmitted for the radio area WA1 is equal to or higher than the first threshold power and lower than the second threshold power. Therefore, in this case, the micro base station 20-2 determines the use resource units and the per-unit transmission powers as illustrated in FIG. 8.

Herein, it is assumed that the micro base station 20-2 uses the use resource units and the per-unit transmission powers illustrated in FIG. 7. In this case, an example of a region in which the radio terminal 30 is accommodatable in a radio area that is formed by the micro base station 20-2 is indicated by a dotted line CA22' of FIG. 11.

In contrast, an example of a region in which the radio terminal 30 is accommodatable in the radio area that is formed by the micro base station 20-2 according to the first embodiment is indicated by a dotted line CA22 of FIG. 11. Thus, according to the micro base station 20-2 according to the first embodiment, it is possible to extend the region in which the radio terminal 30 is accommodatable in the ratio area.

The micro base station 20-3 also performs the process of FIG. 10 as in the micro base station 20-1. In the present example, it is assumed that the reception power of the downlink radio signal at the micro base station 20-3, which is transmitted for the radio area WA1 is lower than the first threshold power. Therefore, in this case, the micro base station 20-3 determines the use resource units and the per-unit transmission powers as illustrated in FIG. 7.

As described above, the micro base station 20-i according to the first embodiment forms a second radio area WA2-i in the first radio area WA1. The micro base station 20-i measures a reception power of a downlink radio signal that is transmitted for the first radio area WA1. The micro base station 20-i controls distribution of a transmission power for a radio resource to be assigned to a downlink radio signal to be transmitted for the second radio area WA2-i, according to the measured reception power.

Thus, the micro base station 20-i can increase a power of the second radio area WA2-i to be distributed to the radio resource to be assigned to a certain signal (in the present example, reference signal) as the reception power of the first radio area WA1 increases. Therefore, it is possible to set the reception power of the signal, which is included in the downlink radio signal transmitted for the second radio area WA2-i, at the radio terminal 30 to be higher than the reception power of the downlink radio signal, which is transmitted for the first radio area WA1, at the radio terminal 30. Thus, it is possible to increase the number of the radio terminals 30 that are accommodated by the micro base station 20-i in the second radio area WA2-i. As a result, a communication load can be dispersed.

Furthermore, the micro base station 20-i according to the first embodiment increases a per-unit transmission power that is a transmission power per resource unit, and decreases the number of resource units in a downlink radio signal to be transmitted for the second radio area WA2-i. Therefore, the micro base station 20-i performs control for distribution of the transmission power.

In this way, even when the per-unit transmission power is increased, it is possible to suppress an increase in a sum of transmission powers for the radio resource to be assigned to the downlink radio signal to be transmitted for the second radio area WA2-i.

Furthermore, the micro base station 20-i according to the first embodiment performs the control for distribution of the transmission power such that the per-unit transmission power increases as the measured reception power increases.

Thus, the micro base station 20-i can increase a power of the second radio area WA2-i to be distributed to resource units to be assigned to a certain signal (in the present example, reference signal) as a reception power of the first radio area WA1 increases. Therefore, the reception power of the signal, which is included in the downlink radio signal transmitted for the second radio area WA2-i, at the radio terminal 30 can be higher than the reception power of the downlink radio signal, which is transmitted for the first radio area WA1, at the radio terminal 30. Thus, it is possible to increase the number of the radio terminals 30 that are accommodated by the micro base station 20-i in the second radio area WA2-i. As a result, a communication load can be dispersed.

Furthermore, the micro base station 20-i according to the first embodiment decreases the number of resource units by not assigning a resource unit assignable to data to the downlink radio signal.

In addition, the micro base station 20-i according to the first embodiment sets a per-unit transmission power of a resource unit to be assigned to the reference signal to be higher than a per-unit transmission power of a resource unit to be assigned to data.

Thus, the reception power of the reference signal, which is included in the downlink radio signal transmitted for the second radio area WA2-i, at the radio terminal 30 can be higher than the reception power of the downlink radio signal, which is transmitted for the first radio area WA1, at the radio terminal 30. As a result, a communication load can be dispersed. Furthermore, it is possible to suppress an increase in a sum of transmission powers for the radio resource to be assigned to the downlink radio signal that is transmitted for the second radio area WA2-i.

The first table stored by the micro base station 20 is set such that different use resource units and different per-unit transmission powers correspond to respective three ranges of reception power. Alternatively, the first table is set such that different use resource units and different per-unit transmission powers may correspond to respective two or more than four ranges of reception power.

Alternatively, the micro base station 20-i may set a per-unit transmission power of a resource unit to which the broadcast signal is assigned to be equal to a per-unit transmission power of a resource unit to which the reference signal is assigned. Alternatively, the micro base station 20-i may set a per-unit transmission power of a resource unit to which the synchronization signal is assigned to be equal to the per-unit transmission power of a resource unit to which the reference signal is assigned. In this case, the micro base station 20-i maintains a sum of transmission powers for respective RBs to be constant by decreasing the per-unit transmission power of other resource units by a magnitude corresponding to an increased amount of per-unit transmission powers of resource units to which the broadcast signal and the synchronization signal are assigned.

Although the micro base station 20 determines the per-unit transmission powers based on the first table, the micro base station 20 may determine the per-unit transmission powers based on a mathematical formula. In this case, the micro base station 20 determines a per-unit transmission power $P_{rs}$ of the resource unit, to which the reference signal is to be assigned, based on Mathematical Formula 1.

$$P_{rs}=\min\{\max(P_0, aP_m+b), P_{max}\} \quad \text{[Mathematical Formula 1]}$$

In Mathematical Formula 1, "a" and "b" represent constants. $P_{max}$ represents an upper limit of the per-unit transmission power $P_{rs}$. $P_m$ represents a reception power of the downlink radio signal, which is transmitted by the macro base station 10-1 for the radio area WA1, at the micro base station 20. When downlink radio signals transmitted for a plurality of radio areas by the macro base stations 10 are received by the micro base station 20, $P_m$ may represent a maximum value of the reception power. $P_0$ is determined based on Mathematical Formula 2.

$$P_0 = P_{total} - 10 \cdot \log_{10}(N_{sc}) \quad \text{[Mathematical Formula 2]}$$

Herein, $N_{sc}$ represents the total number of sub-carriers of a system band. For example, when the system bandwidth for an LTE scheme is 5 MHz, the $N_{sc}$ is 300. $P_{total}$ represents the maximum value of a power which the micro base station 20 can output as the transmission power of a radio signal.

In this case, the micro base station 20 determines the number of use resource units $N_{sc,\,data}$, among resource units to which the reference signal is not assigned, and a per-unit transmission power $P_{data}$ of each of use resource units among the resource units to which the reference signal is not assigned, so as to satisfy Mathematical Formula 3. Herein, $N_{sc,\,rs}$ represents the number of resource units to which the reference signal is to be assigned.

$$N_{sc,rs} \cdot 10^{\frac{P_{rs}}{10}} + N_{sc,data} \cdot 10^{\frac{P_{data}}{10}} \le 10^{\frac{P_{total}}{10}} \quad \text{[Mathematical Formula 3]}$$

Even in this case, the micro base station 20 determines the use resource units and per-unit transmission powers such that a sum of transmission powers for the respective RBs has a fixed value independently of reception power.

Alternatively, the micro base station 20 may include a plurality of antennas and transmit the downlink radio signal from the plurality of antennas. For example, it is assumed that the micro base station 20 includes first to fourth antennas. In this case, REs in two RBs that are successive in a time direction in a downlink radio signal to be transmitted from the first to fourth antennas are assigned to the reference signals RS, as respectively illustrated in FIGS. 6, 12, 13, and 14.

Figure 13:
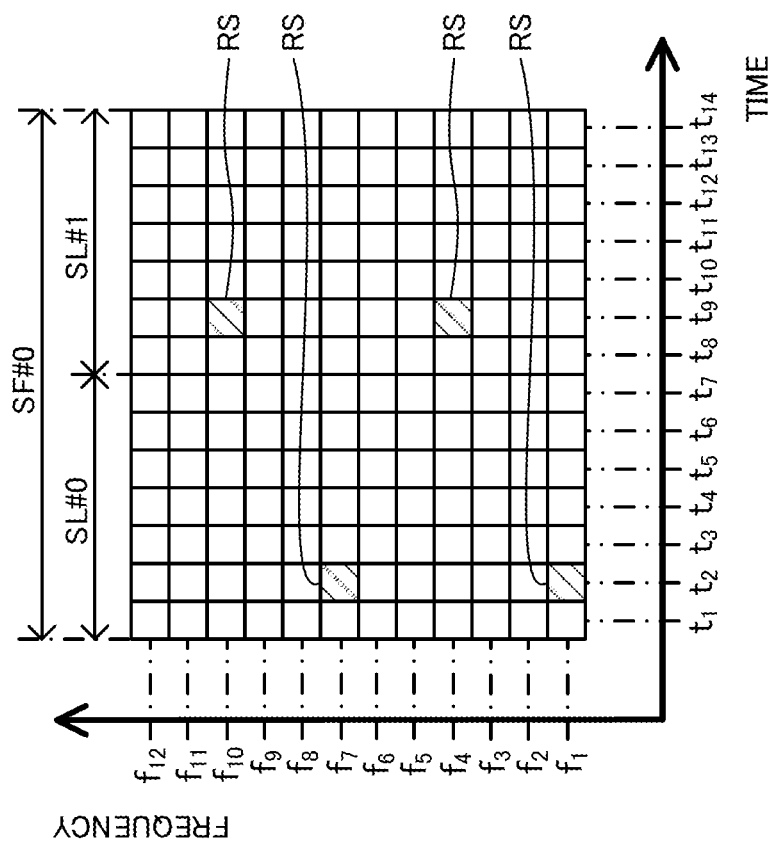
FIG. 13 is an explanatory diagram illustrating an example of a resource block in a case where a downlink radio signal is transmitted from a plurality of antennas.

For example, in the assignment illustrated in FIG. 13, REs, which correspond to sub-carrier frequencies $f_4$ and $f_{10}$, of an RB in slot SL#0 are not assigned to the reference signal RS. Similarly, in the assignment illustrated in FIG. 13, REs, which correspond to sub-carrier frequencies $f_1$ and $f_7$, of an RB in slot SL#1 are not assigned to the reference signal RS.

Figure 14:
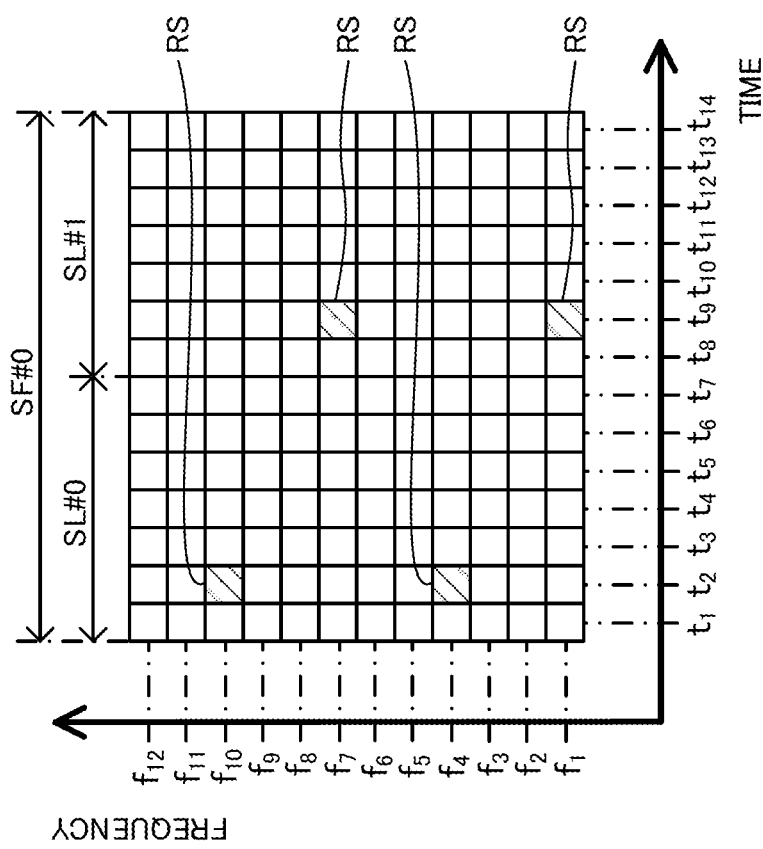
FIG. 14 is an explanatory diagram illustrating an example of a resource block in a case where a downlink radio signal is transmitted from a plurality of antennas.

Similarly, in the assignment illustrated in FIG. 14, REs, which correspond to sub-carrier frequencies $f_1$ and $f_7$, of the RB in slot SL#0 are not assigned to the reference signal RS. Similarly, in the assignment illustrated in FIG. 14, REs, which correspond to sub-carrier frequencies $f_4$ and $f_{10}$, of the RB in slot SL#1 are not assigned to the reference signal RS.

Therefore, the micro base station 20 may change distribution of a transmission power depending on an antenna. Also, the micro base station 20 may change distribution of a transmission power depending on a slot. For example, when the reception power is equal to or higher than the first threshold power and the reception power is lower than the second threshold power, the micro base station 20 may determine the use resource units and the per-unit transmission powers illustrated in FIG. 8 for the first and second antennas.

Figure 15:
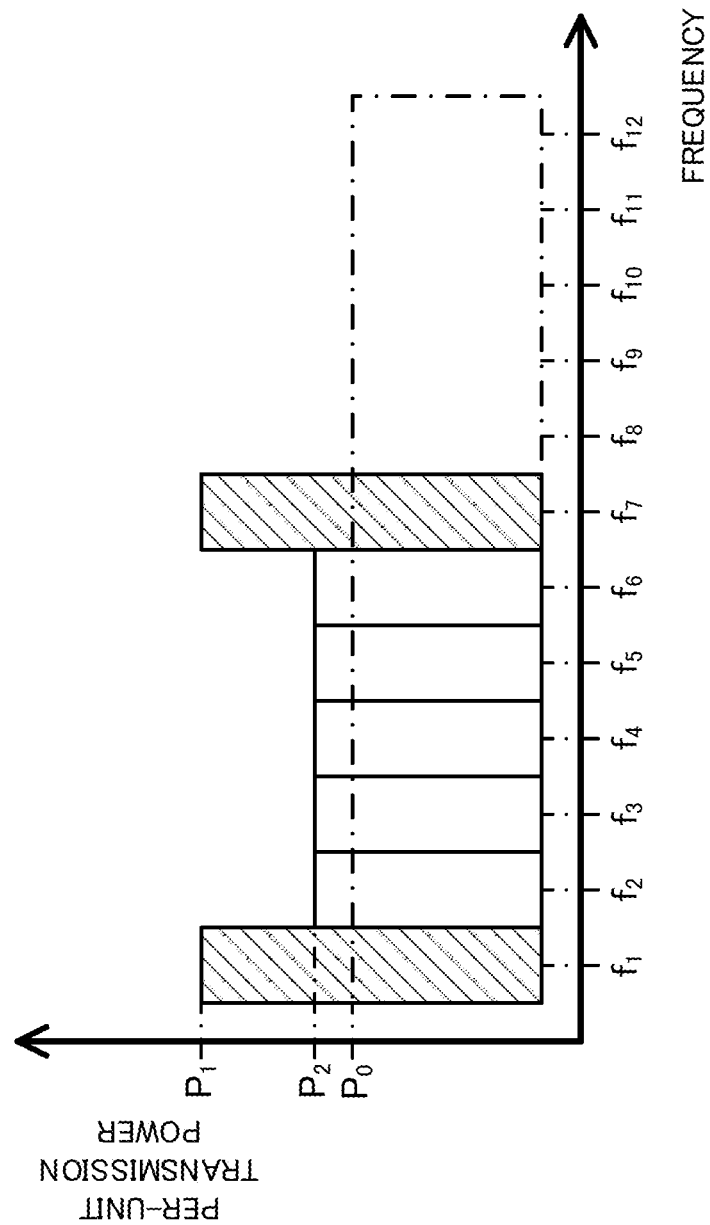
FIG. 15 is an explanatory diagram illustrating a setting example of use resource units and a per-unit transmission power of each use resource unit in a case where a downlink radio signal is transmitted from a plurality of antennas.
Figure 16:
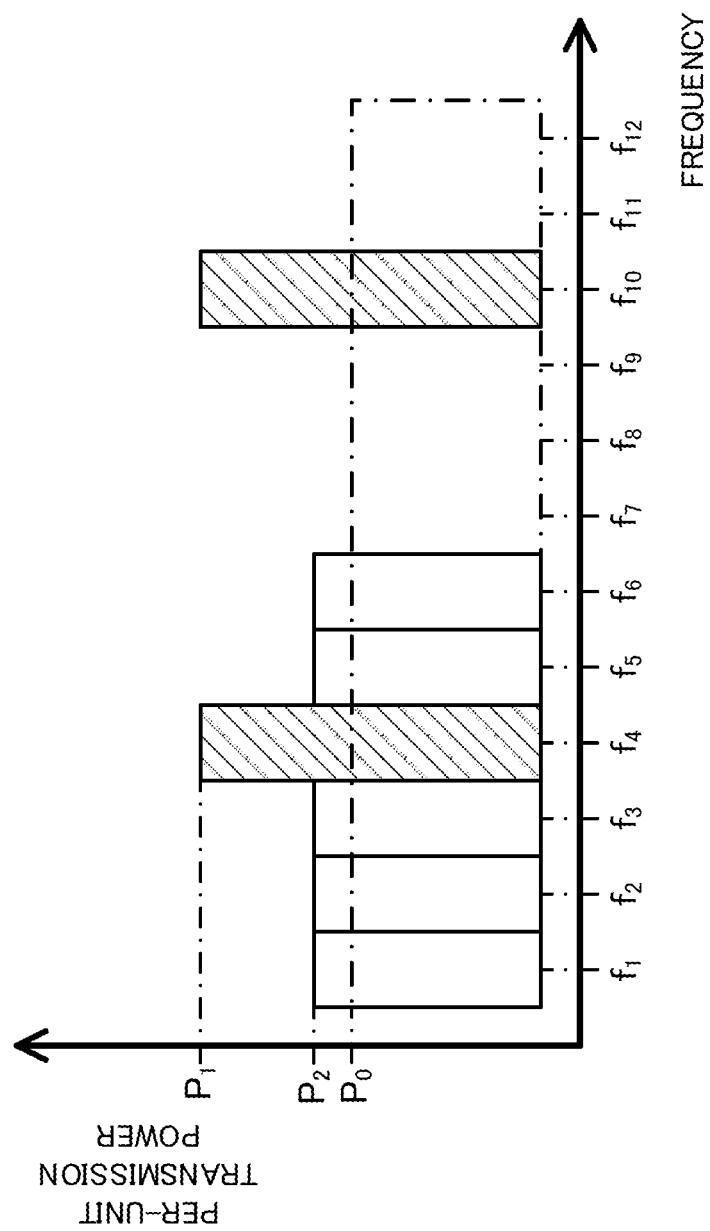
FIG. 16 is an explanatory diagram illustrating a setting example of use resource units and a per-unit transmission power of each use resource unit in a case where a downlink radio signal is transmitted from a plurality of antennas.

In this case, the micro base station 20 may determine the user resource units and the per-unit transmission powers illustrated in FIG. 15 for a slot SL#0 of the third antenna, and determine the use resource units and the per-unit transmission powers illustrated in FIG. 16 for a slot SL#1 of the third antenna. In this case, the micro base station 20 may determine the use resource units and the per-unit transmission powers illustrated in FIG. 16 for a slot SL#0 of the fourth antenna and may determine the use resource units and the per-unit transmission powers illustrated in FIG. 15 for a slot SL#1 of the fourth antenna.

<First Modification of First Embodiment>

Next, a radio communication system according to a first modification of the first embodiment will be described. The radio communication system according to the first modification of the first embodiment is different from the radio communication system according to the first embodiment in that distribution of a transmission power is controlled based on a reception power from a micro base station. A description will be given below while focusing on the difference.

Figure 17:
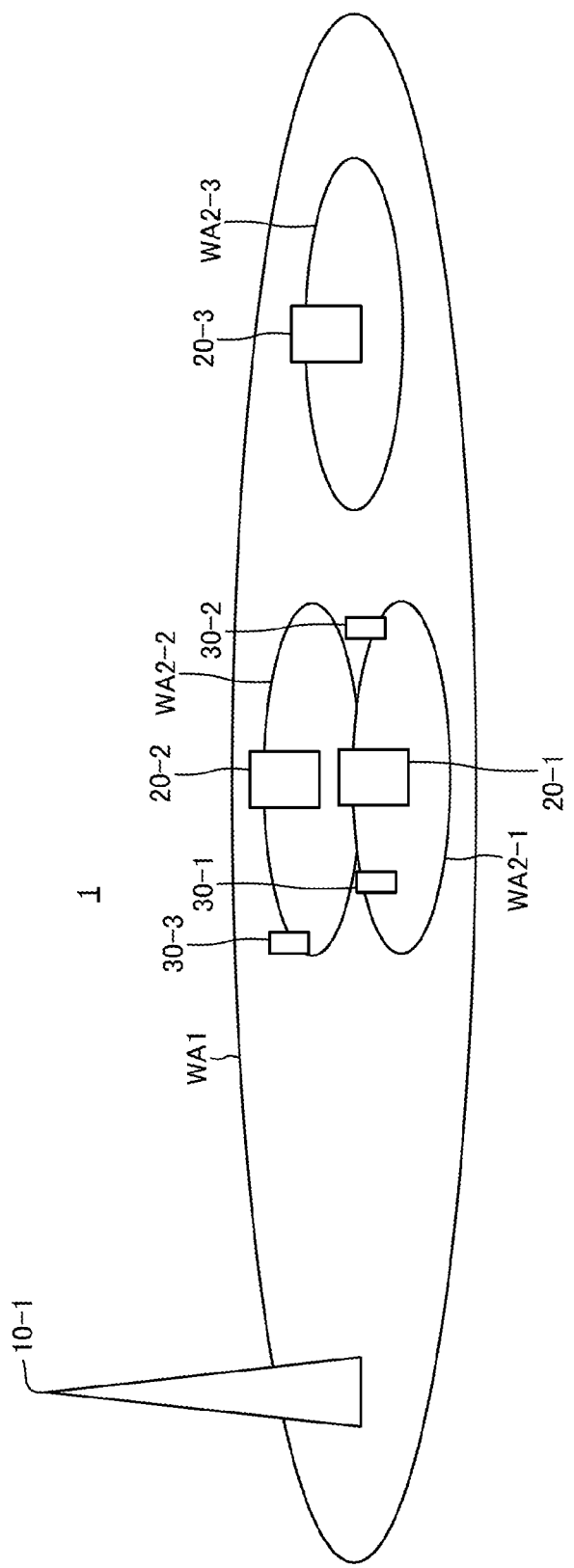
FIG. 17 is a block diagram illustrating a configuration example of a radio communication system according to a first modification of the first embodiment.

As illustrated in FIG. 17, in the radio communication system 1 according to the first modification, the micro base stations 20-1 and 20-2 are arranged such that the micro base station 20-1 is capable of receiving a downlink radio signal transmitted for a radio area WA2-2 by the micro base station 20-2.

In the present example, a signal after A/D conversion by the A/D converter 280 of the micro base station 20-1 includes a first portion, a second portion, and a third portion. The first portion is a portion corresponding to an uplink radio signal transmitted by the radio terminal 30 for a radio area formed by the micro base station 20-1 among the signal after the A/D conversion. The second portion is a portion corresponding to a downlink radio signal transmitted by the macro base station 10-1 for the radio area WA1 formed by the macro base station 10-1 among the signal after the A/D conversion. The third portion is a portion corresponding to a downlink radio signal transmitted by the micro base station 20-2 for the radio area WA2-2 formed by the micro base station 20-2 among the signal after the A/D conversion.

The measure 296 of the micro base station 20-1 measures a reception power of the downlink radio signal transmitted for the radio area WA1 by the macro base station 10-1 based on the second portion of the signal after the A/D conversion. In the present example, the reception power of the downlink radio signal transmitted for the radio area WA1 is also referred to as a reception power of a large area. In the present example, the measure 296 measures the reception power of the downlink radio signal based on a reference signal that is included in the downlink radio signal that is transmitted for the radio area WA1. The radio area WA1 is an example of a first radio area.

Furthermore, the measure 296 of the micro base station 20-1 measures a reception power of the downlink radio signal transmitted for the radio area WA2-2 by the micro base station 20-2 based on the third portion of the signal after the A/D conversion. In the present example, the reception power of the downlink radio signal transmitted for the radio area WA2-2 is also referred to as a reception power of a small area. In the present example, the measure 296 measures the reception power of the downlink radio signal based on a reference signal that is included in the downlink radio signal that is transmitted for the radio area WA2-2. The radio area WA2-2 is an example of a third radio area.

The controller 220 of the micro base station 20-1 controls distribution of a transmission power based on the reception power of the large area and the reception power of the small area which are measured by the measure 296.

In the present example, the controller 220 previously stores information in which the reception power is associated with a use resource unit and a per-unit transmission power, instead of information stored in the first embodiment. For example, the controller 220 stores a second table as the information and determines a use resource unit number and per-unit transmission powers based on the stored second table. The use resource unit number is the number of the use resource units.

In the present example, the second table is set such that, as the reception power increases, the per-unit transmission power increases and the use resource unit number decreases. In the present example, when the reception power is lower than the first threshold power, the second table is set such that the use resource unit number for each RB is 12. Also, when the reception power is equal to or higher than the first threshold power and the reception power is lower than the second threshold power, the second table is set such that the use resource unit number for each RB is 8. Also, when the reception power is equal to or higher than the second threshold power, the second table is set such that the use resource unit number for each RB is 6.

The controller 220 determines the use resource unit number based on the reception power of the large area and the second table.

The controller 220 determines a number of use resource units the number of which corresponds to the determined use resource unit number. In the present example, when the reception power of the small area is equal to or lower than a certain third threshold power, the controller 220 determines the use resource units from a basic selection target portion. On the other hand, when the reception power of the small area is higher than the third threshold power, the controller 220 determines the use resource units from a restrictive selection target portion.

Herein, the basic selection target portion is the whole of a system band. The restrictive selection target portion is a portion obtained by excluding, from the basic selection target portion, at least one resource unit, the frequency of which is identical to a frequency of a resource unit to be assigned to data in the small area.

Figure 18:
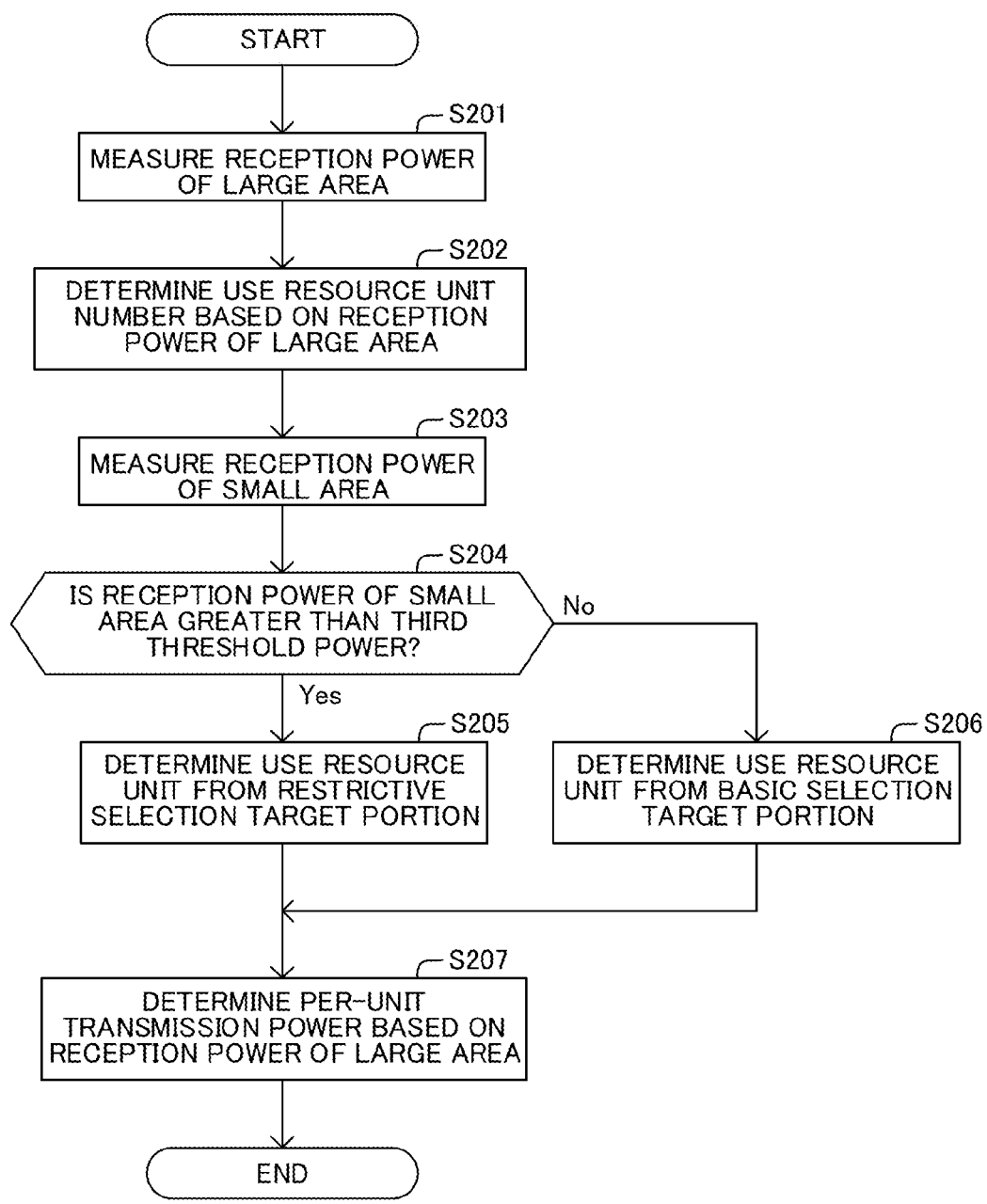
FIG. 18 is a flowchart illustrating an example of a process which the micro base station of FIG. 17 performs.

The micro base station 20-1 performs a process indicated by a flowchart of FIG. 18 when the micro base station 20-1 is activated, instead of the process of FIG. 10 according to the first embodiment. The micro base station 20-1 may perform the process of FIG. 18 each time when a certain period of time has elapsed, or according to a control signal received from the communication network through the communication interface 210.

In the present example, the micro base station 20-1 measures a reception power of the large area (step S201 of FIG. 18). Subsequently, the micro base station 20-1 determines a use resource unit number based on the measured reception power of the large area and the stored second table (step S202 of FIG. 18). Herein, it is assumed that the reception power is equal to or higher than the first threshold power, and the reception power is lower than the second threshold power. In this case, the micro base station 20-1 determines 8 as the use resource unit number.

Then, the micro base station 20-1 measures a reception power of the small area (step S203 of FIG. 18). The micro base station 20-1 determines whether the measured reception power of the small area is higher than the third threshold power (step S204 of FIG. 18).

When the reception power of the small area is higher than the third threshold power, the micro base station 20-1 makes a determination of "Yes", and determines use resource units, the number of which corresponds to the determined use resource unit number, from the restrictive selection target portion (step S205 of FIG. 18).

Figure 19:
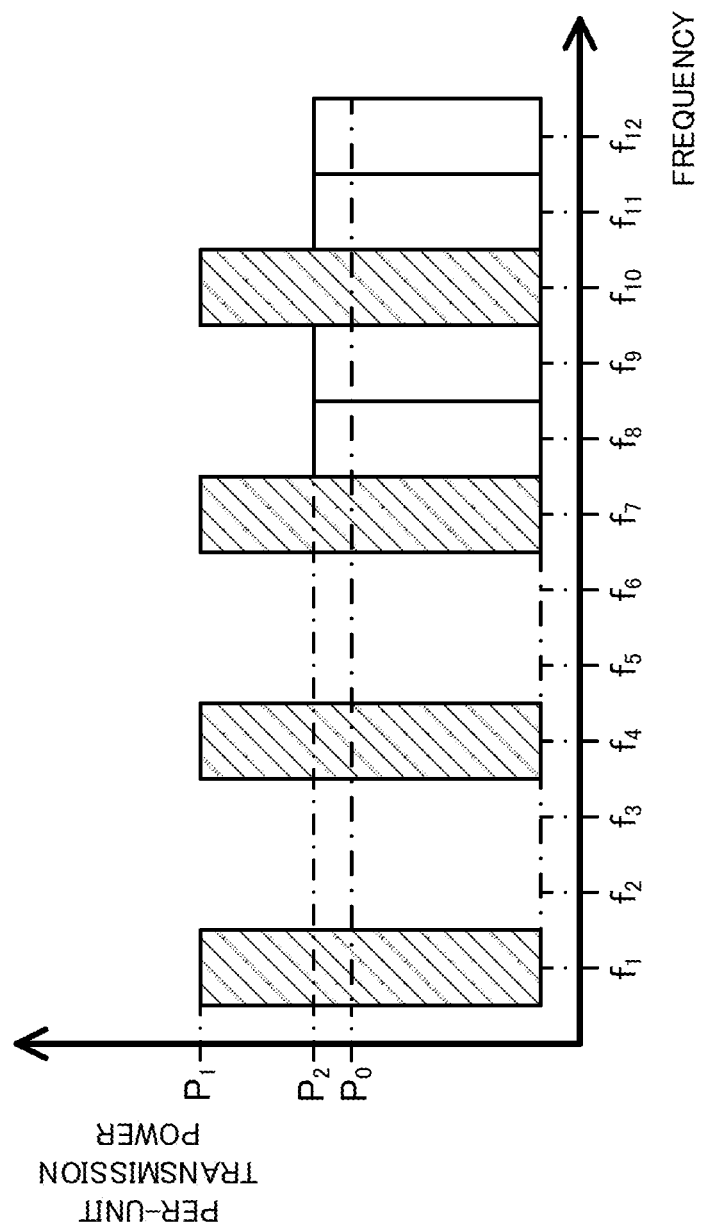
FIG. 19 is an explanatory diagram illustrating a setting example of use resource units and a per-unit transmission power of each use resource unit according to the first modification of the first embodiment.

In the present example, it is assumed that the micro base station 20-2 transmits the downlink radio signal for the radio area WA2-2 by using the use resource units and the per-unit power which are illustrated in FIG. 8. In this case, the restrictive selection target portion is a portion obtained by excluding resource units corresponding to sub-carrier frequencies $f_2$, $f_3$, $f_5$, and $f_6$ from the basic selection target portion. Therefore, in the present example, the micro base station 20-1 determines resource units corresponding to sub-carrier frequencies $f_1$, $f_4$, and $f_7$ to $f_{12}$ as the use resource units as illustrated in FIG. 19.

The micro base station 20-1 determines a per-unit transmission power for each of the determined use resource units based on the measured reception power of the large area and the stored second table (step S207 of FIG. 18).

In a case where the reception power of the small area is equal to or lower than the third threshold power, the micro base station 20-1 makes a determination of "No" in step S204 of FIG. 18, and determines use resource units, the number of which corresponds to the determined use resource unit number, from the basic selection target portion (step S206 of FIG. 18). In this case, for example, the micro base station 20-1 determines resource units corresponding to the sub-carrier frequencies $f_1$ to $f_7$, and $f_{10}$ as the use resource units as illustrated in FIG. 8, as in the micro base station 20-2. The micro base station 20-1 performs the processing of step S207 of FIG. 18.

As described above, according to the micro base station 20-1 according to the first modification of the first embodiment, a resource unit that is not assigned to a downlink radio signal is selected such that a certain resource unit having an assignment target frequency is assigned to data of the second radio area WA2-1. The assignment target frequency is a frequency different from a frequency of a resource unit that is assigned to data in the third radio area WA2-2 formed in the first radio area WA1.

Thus, it is possible to suppress interference to a portion corresponding to data of the downlink radio signal transmitted for the second radio area WA2-1, of the portion corresponding to data of the downlink radio signal transmitted for the third radio area WA2-2. As a result, it is possible to increase reception quality, which is for the portion corresponding to the data of the downlink radio signal transmitted for the second radio area WA2-1, at the radio terminal 30.

In a case where the reception power of the small area is equal to or higher than a fourth threshold power that is higher than the third threshold power, the micro base station 20-1 may use the use resource unit number and the per-unit transmission powers, as in the case where the reception power of the large area is lower than the first threshold power.

As a result, it is possible to disperse communication load since the radio terminal 30 is accommodated by the micro base station 20-2 in the third radio area WA2-2.

<Second Modification of First Embodiment>

Next, a radio communication system according to a second modification of the first embodiment will be described. The radio communication system according to the second modification of the first embodiment is different from the radio communication system according to the first embodiment in that distribution of a transmission power is controlled based on the number of radio terminals that are accommodated in a radio area. A description will be given below while focusing on the difference.

The controller 220 of the micro base station 20-i according to the second modification acquires the number of radio terminals 30 that are already accommodated in a radio area WA2-i formed by the micro base station 20-i. The number of the radio terminals 30 is also referred to as the number of accommodated terminals. In a case where the acquired number of accommodated terminals is greater than a certain accommodation threshold value, the controller 220 controls distribution of a transmission power based on the reception power of the downlink radio signal transmitted for the first radio area WA1. On the other hand, the controller 220 does not perform the control of the distribution of the transmission power when the acquired number of accommodated terminals is equal to or less than the accommodation threshold value.

Figure 20:
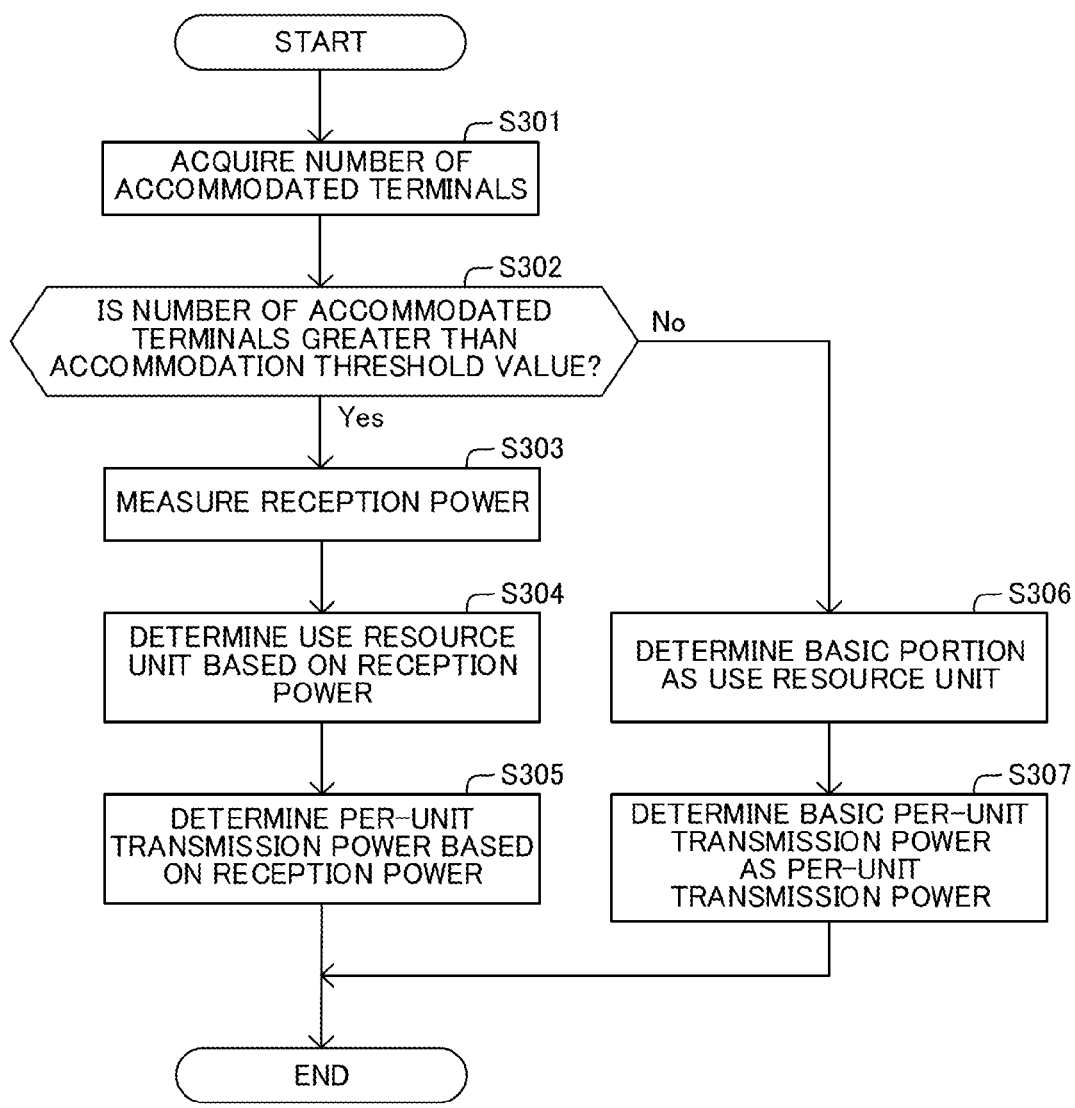
FIG. 20 is a flowchart illustrating an example of a process performed by a micro base station according to a second modification of the first embodiment.

The micro base station 20-1 performs a process indicated by a flowchart of FIG. 20, instead of the process of FIG. 10 according to the first embodiment, each time when a certain period of time has been elapsed. The micro base station 20-1 may perform a process of FIG. 20 according to a control signal received from the communication network through the communication interface 210.

The micro base station 20-1 acquires the number of accommodated terminals (step S301 of FIG. 20). Next, the micro base station 20-1 determines whether the acquired number of accommodated terminals is greater than the accommodation threshold value (step S302 of FIG. 20).

When the number of accommodated terminals is greater than the accommodation threshold value, the micro base station 20-1 makes a determination of "Yes" and performs processing of steps S303 to S305 of FIG. 20, as in steps S101 to S103 of FIG. 10.

On the other hand, when the number of accommodated terminals is equal to or less than the accommodation threshold value, the micro base station 20-1 makes a determination of "No" in step S302 of FIG. 20, and determines a basic portion as use resource units (step S306 of FIG. 20). Next, the micro base station 20-1 determines a basic per-unit transmission power as a per-unit transmission power for each of the determined use resource units (step S307 of FIG. 20). Therefore, in this case, the micro base station 20-1 uses the use resource units and the per-unit transmission powers illustrated in FIG. 7.

As described above, according to the micro base station 20-1 according to the second modification of the first embodiment, the controller 220 does not perform the control of distribution of the transmission power when the number of radio terminals 30 that are accommodated in the second radio area WA2-1 is greater than the accommodation threshold value.

When the number of radio terminals 30 that are accommodated in the second radio area WA2-1 is greater than the accommodation threshold value, a load of the micro base station 20-1 is already sufficiently high. Therefore, in this case, it is apprehended that, when the distribution of the transmission power is controlled, the number of radio terminals 30 that are accommodated in the second radio area WA2-1 increases, and the load of the micro base station 20-1 excessively increases. In contrast, according to the micro base station 20-1 according to the second modification, it is possible to suppress the load of the micro base station 20-1.

<Third Modification of First Embodiment>

Next, a radio communication system according to a third modification of the first embodiment will be described. The radio communication system according to the third modification of the first embodiment is different from the radio communication system according to the first embodiment in that distribution of a transmission power is controlled based on the number of radio terminals newly accommodatable in a radio area. A description will be given below while focusing on the difference.

The controller 220 of the micro base station 20-i according to the third modification estimates the number of radio terminals 30 newly accommodatable in a radio area WA2-i formed by the micro base station 20-i. The number of the radio terminals 30 is also referred to as the number of increased accommodated terminals.

In the present example, the controller 220 estimates the number of increased accommodated terminals based on the number of times a CQI transmitted by the radio terminal 30 is equal to or less than a threshold value for a certain period of time. The CQI is an abbreviation for Channel Quality Indicator. For example, the controller 220 estimates a value that increases as the above number of times increases as the number of increased accommodated terminals.

In a case where the estimated number of increased accommodated terminals is greater than a certain increase threshold value, the controller 220 controls distribution of a transmission power based on the reception power of the downlink radio signal transmitted for the first radio area WA1. On the other hand, when the estimated number of increased accommodated terminals is equal to or less than the increase threshold value, the controller 220 does not perform the control of distribution of the transmission power.

Figure 21:
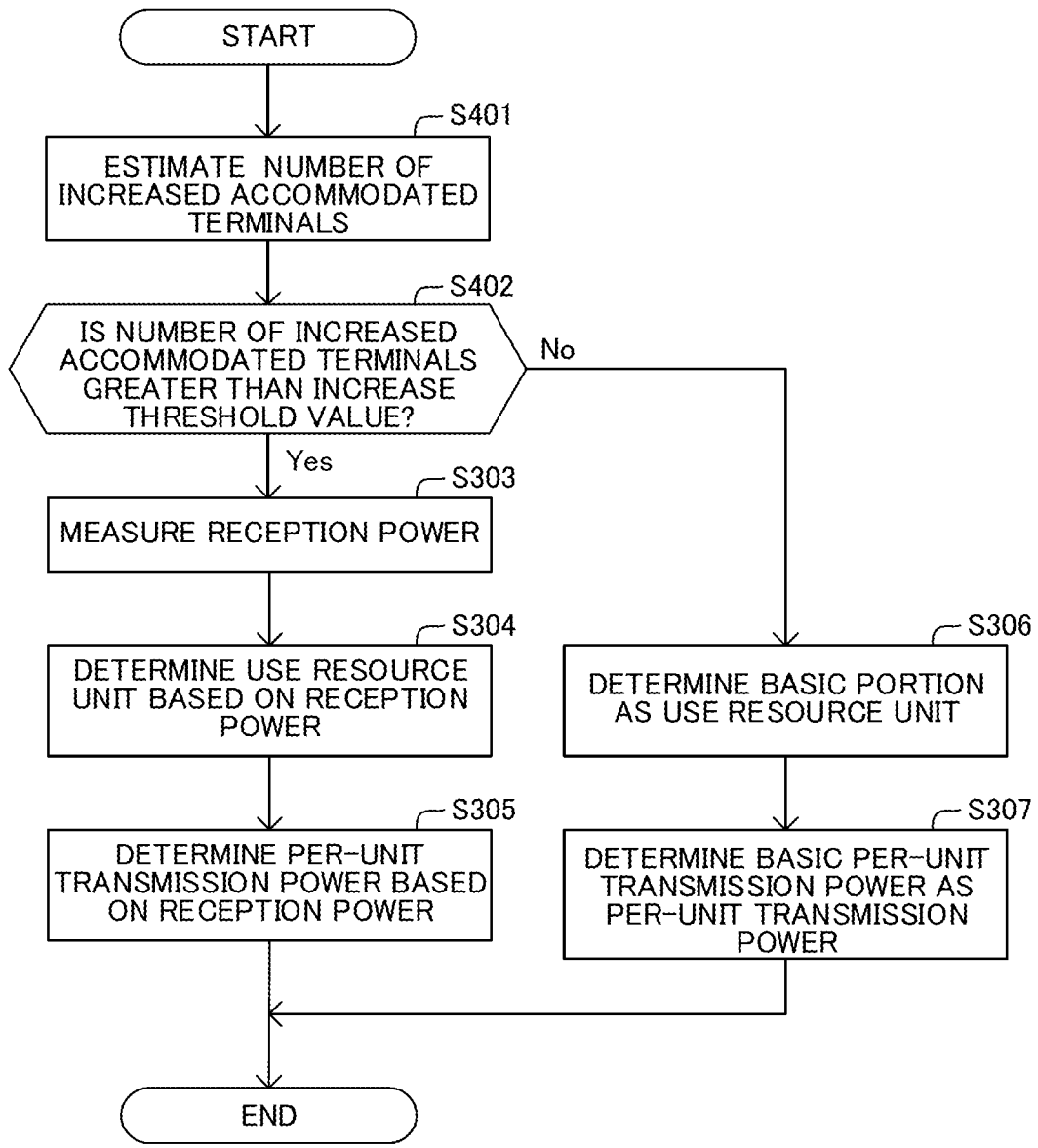
FIG. 21 is a flowchart illustrating an example of a process performed by a micro base station according to a third modification of the first embodiment.

The micro base station 20-1 performs a process indicated by a flowchart of FIG. 21, instead of the process of FIG. 10 according to the first embodiment, each time when a certain period of time has been elapsed. The micro base station 20-1 may perform a process of FIG. 21 according to a control signal received from the communication network through the communication interface 210.

The micro base station 20-1 estimates the number of increased accommodated terminals (step S401 of FIG. 21). Subsequently, the micro base station 20-1 determines whether the estimated number of increased accommodated terminals is greater than the increase threshold value (step S402 of FIG. 21).

When the number of increased accommodated terminals is greater than the increase threshold value, the micro base station 20-1 makes a determination of "Yes" and performs processing of steps S303 to S305 of FIG. 21, as in steps S303 to S305 of FIG. 20.

On the other hand, when the number of increased accommodated terminals is equal to or less than the increase threshold value, the micro base station 20-1 makes a determination of "No" in step S402 of FIG. 21, and performs processing of steps S306 to S307 of FIG. 21, as in steps S306 to S307 of FIG. 20.

As described above, according to the micro base station 20-1 according to the third modification of the first embodiment, the controller 220 estimates the number of radio terminals 30 newly accommodatable in the second radio area WA2-1 by the control for distribution of the transmission power. Furthermore, the controller 220 does not perform the control when the estimated number of the radio terminals 30 is less than the increase threshold value.

For example, as the number of the radio terminals 30 located near a border of the second radio area WA2-1 decreases, in a case where the control for distribution of the transmission power is performed, the number of the radio terminals 30 which are newly accommodated in the second radio area WA2-1 decreases. Therefore, according to the micro base station 20-1 according to the third modification, it is possible to reduce a possibility that the control for the distribution of the transmission power is performed wastefully.

<Second Embodiment>

Next, a radio communication system according to a second embodiment will be described. The radio communication system according to the second embodiment is different from the radio communication system according to the first embodiment in that the number of use resource units is decreased by narrowing a system bandwidth. A description will be given below while focusing on the difference.

The controller 220 according to the second embodiment previously stores information in which a reception power is associated with a system band and a per-unit transmission power, instead of the information stored in the first embodiment. For example, the controller 220 stores a third table as the information and determines the system band and the per-unit transmission power based on the stored third table.

In the present example, the third table is set such that, as the reception power increases, the per-unit transmission power increases and, the system bandwidth narrows. In the present example, the third table is set such that a common per-unit transmission power is determined for resource units included in the determined system band. In the present example, the third table is set such that a product of a per-unit transmission power determined for an arbitrary reception power and a system bandwidth of a system band determined for the reception power is constant.

Figure 22:
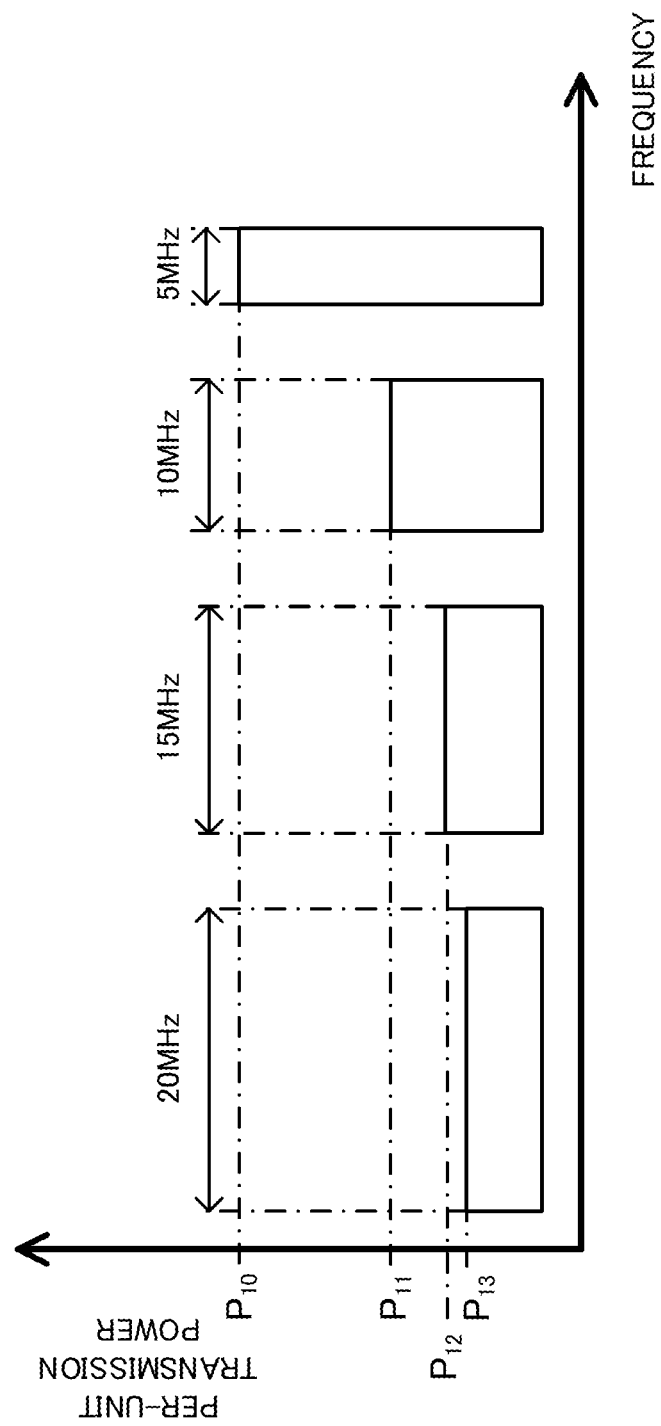
FIG. 22 is an explanatory diagram illustrating a setting example of a system band and a per-unit transmission power of each use resource unit according to a second embodiment.

In the present example, as illustrated in FIG. 22, the third table is set such that, when the reception power is lower than the first threshold power, the system band having a system bandwidth of 20 MHz and a per-unit transmission power $P_{13}$ are determined. Furthermore, the third table is set such that, when the reception power is equal to or higher than the first threshold power, and the reception power is lower than the second threshold power, a system band having a system bandwidth of 15 MHz and a per-unit transmission power $P_{12}$ are determined.

Similarly, the third table is set such that, when the reception power is equal to or higher than the second threshold power, and the reception power is lower than the third threshold power, a system band having a system bandwidth of 10 MHz and a per-unit transmission power $P_{11}$ are determined. Furthermore, the third table is set such that, when the reception power is equal to or higher than the third threshold power, the system band having a system bandwidth of 5 MHz and a per-unit transmission power $P_{10}$ are determined.

Figure 23:
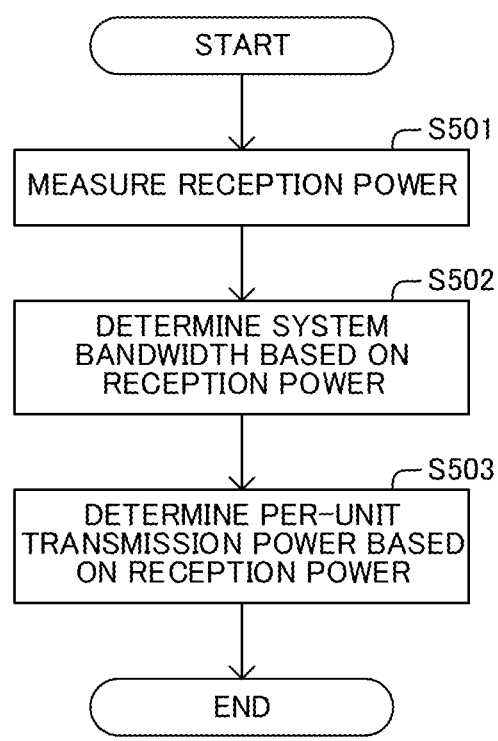
FIG. 23 is a flowchart illustrating an example of a process performed by a micro base station according to the second embodiment.

The micro base station 20-1 performs a process indicated by the flowchart of FIG. 23, instead of the process of FIG. 10 according to the first embodiment, when the micro base station 20-1 is activated. The micro base station 20-1 may perform the process of FIG. 23 each time when a certain period of time has elapsed, or according to a control signal received from the communication network through the communication interface 210.

The micro base station 20-1 measures a reception power of a downlink radio signal transmitted by the macro base station 10-1 for the radio area WA1 (step S501 of FIG. 23). Subsequently, the micro base station 20-1 determines a system band based on the measured reception power and the stored third table (step S502 of FIG. 23). Furthermore, the micro base station 20-1 determines a per-unit transmission power for each of resource units included in the determined system band based on the measured reception power and the stored third table (step S503 of FIG. 23). In the process of FIG. 23, the processing of step S503 may be performed earlier than the processing of step S502.

As described above, the micro base station 20-i according to the second embodiment decreases the number of resource units assigned to the downlink radio signal by narrowing the system bandwidth.

In this way, even when the per-unit transmission power is increased, it is possible to suppress an increase in the sum of transmission powers for the radio resource to be assigned to the downlink radio signal that is transmitted for the second radio area WA2-i.

The micro base station 20-1 may increase a per-unit transmission power of a resource unit to which a reference signal is assigned to be higher than a per-unit transmission power of a resource unit to which the reference signal is not assigned.

In the respective embodiments, the first radio area WA1 and the second radio area WA2-i are respectively formed by the base stations 10-1 and 20-i which are different from each other. Alternatively, the first radio area WA1 and the second radio area WA2-i both may be formed by the macro base station 10-1. In this case, the macro base station 10-1 may include a Remote Radio Head (RRH), and may form the second radio area WA2-i by the RRH.

Alternatively, in the respective embodiments, the radio communication system 1 may use a Cell Range Expansion (CRE).

Alternatively, the micro base station 20 may perform a combination of the control for distribution of a transmission power according to the first embodiment and the control for distribution of a transmission power according to the second embodiment.

As described above, even when the reception power of the downlink radio signal transmitted for the first radio area is higher than the reception power of the downlink radio signal transmitted for the second radio area, it is possible to disperse a communication load.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio base station that measures a reception power of a downlink radio signal transmitted for a first radio area and controls a transmission power for a radio resource assigned to a downlink radio signal to be transmitted for a second radio area according to the measured reception power, the radio resource including a plurality of resource units obtained by dividing the radio resource in a frequency domain, the control being performed by increasing a per-unit transmission power that is a transmission power per resource unit and decreasing a number of the resource units assigned to the downlink radio signal.

2. The radio base station according to claim 1, wherein the control is performed such that the per-unit transmission power increases as the measured reception power increases.

3. The radio base station according to claim 1, wherein the decrease in the number of the resource units is performed by narrowing a system bandwidth.

4. The radio base station according to claim 1, wherein the decrease in the number of the resource units is performed by not assigning a resource unit assignable to data to the downlink radio signal.

5. The radio base station according to claim 4, wherein the resource unit that is not assigned to the downlink radio signal is selected such that a resource unit, a frequency of which is different from a frequency of a resource unit assigned to data in a third radio area formed in the first radio area, is assigned to data in the second radio area.

6. The radio base station according to claim 1, wherein a per-unit transmission power of a resource unit assigned to a second signal to be received by a radio terminal in priority to a first signal is higher than a per-unit transmission power of a resource unit assigned to the first signal.

7. The radio base station according to claim 6, wherein the second signal includes at least one of a reference signal, a broadcast signal, and a synchronization signal.

8. The radio base station according to claim 1, wherein the control is not performed when a number of radio terminals accommodated in the second radio area is greater than a threshold value.

9. The radio base station according to claim 1, wherein the radio base station estimates a number of radio terminals newly accommodatable in the second radio area by the control and does not perform the control when the estimated number of the radio terminals is less than a threshold value.

10. The radio base station according to claim 1, wherein the radio base station measures a reception power of a downlink radio signal to be transmitted for a third radio area formed in the first radio area and performs the control based on reception powers respectively measured for the first radio area and the third radio area.

11. A method for controlling a transmission power in a radio base station, the method comprising:
measuring a reception power of a downlink radio signal transmitted for a first radio area; and
controlling a transmission power for a radio resource assigned to a downlink radio signal to be transmitted for a second radio area according to the measured reception power, the radio resource including a plurality of resource units obtained by dividing the radio resource in a frequency domain, the control being performed by increasing a per-unit transmission power that is a transmission power per resource unit and decreasing a number of the resource units assigned to the downlink radio signal.

12. The method for controlling the transmission power in the radio base station according to claim 11, wherein the control is performed such that the per-unit transmission power increases as the measured reception power increases.

* * * * *